US010797888B1

(12) United States Patent
Natarajan et al.

(10) Patent No.: US 10,797,888 B1
(45) Date of Patent: Oct. 6, 2020

(54) METHODS FOR SECURED SCEP ENROLLMENT FOR CLIENT DEVICES AND DEVICES THEREOF

(71) Applicant: F5 Networks, Inc., Seattle, WA (US)

(72) Inventors: Ravi Natarajan, Fremont, CA (US); Wui Chung Lie, San Jose, CA (US); Saxon Amdahl, Mountain View, CA (US); Nicholas Treat, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 114 days.

(21) Appl. No.: 15/411,404

(22) Filed: Jan. 20, 2017

Related U.S. Application Data

(60) Provisional application No. 62/281,166, filed on Jan. 20, 2016.

(51) Int. Cl.
*H04L 9/32* (2006.01)
*H04L 29/06* (2006.01)

(52) U.S. Cl.
CPC ........ *H04L 9/3263* (2013.01); *H04L 63/0428* (2013.01); *H04L 63/10* (2013.01)

(58) Field of Classification Search
CPC .... H04L 9/3263; H04L 63/0428; H04L 63/10
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |
| 4,993,030 A | 2/1991 | Krakauer et al. |
| 5,023,826 A | 6/1991 | Patel |
| 5,053,953 A | 10/1991 | Patel |

(Continued)

FOREIGN PATENT DOCUMENTS

| | | |
|---|---|---|
| AU | 2003300350 A1 | 7/2004 |
| CA | 2080530 | 4/1994 |

(Continued)

OTHER PUBLICATIONS

Big-IP® Access Policy Manager®: Implementations, Version 12.0, F5 Networks, Inc., 2015, pp. 1-108.

(Continued)

*Primary Examiner* — Shin-Hon (Eric) Chen
*Assistant Examiner* — Jessica J South
(74) *Attorney, Agent, or Firm* — Troutman Pepper Hamilton Sanders LLP (Rochester)

(57) ABSTRACT

Methods, non-transitory computer readable media, and mobile application manager apparatus that assists secured SCEP enrollment of client devices includes receiving a certificate signing request and an encrypted device key from an enrolled mobile device. The received certificate signing request is forwarded to a simple certificate enrollment protocol server upon determining a validity of the received encrypted device key. A signed device certificate is received from the simple certificate enrollment protocol server as a response to the forwarded certificate signing request. The secured simple certificate enrollment protocol enrollment is completed forwarding the signed device certificate to the enrolled mobile device.

22 Claims, 4 Drawing Sheets

(56) References Cited

U.S. PATENT DOCUMENTS

| | | |
|---|---|---|
| 5,167,024 A | 11/1992 | Smith et al. |
| 5,218,695 A | 6/1993 | Noveck et al. |
| 5,282,201 A | 1/1994 | Frank et al. |
| 5,299,312 A | 3/1994 | Rocco, Jr. |
| 5,303,368 A | 4/1994 | Kotaki |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,473,362 A | 12/1995 | Fitzgerald et al. |
| 5,475,857 A | 12/1995 | Dally |
| 5,511,177 A | 4/1996 | Kagimasa et al. |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,537,585 A | 7/1996 | Blickenstaff et al. |
| 5,548,724 A | 8/1996 | Akizawa et al. |
| 5,550,965 A | 8/1996 | Gabbe et al. |
| 5,581,764 A | 12/1996 | Fitzgerald et al. |
| 5,583,995 A | 12/1996 | Gardner et al. |
| 5,586,260 A | 12/1996 | Hu |
| 5,590,320 A | 12/1996 | Maxey |
| 5,596,742 A | 1/1997 | Agarwal et al. |
| 5,606,665 A | 2/1997 | Yang et al. |
| 5,611,049 A | 3/1997 | Pitts |
| 5,623,490 A | 4/1997 | Richter et al. |
| 5,649,194 A | 7/1997 | Miller et al. |
| 5,649,200 A | 7/1997 | Leblang et al. |
| 5,659,619 A | 8/1997 | Sudia |
| 5,663,018 A | 9/1997 | Cummings et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,806,061 A | 9/1998 | Chaudhuri et al. |
| 5,812,550 A | 9/1998 | Sohn et al. |
| 5,822,430 A | 10/1998 | Doud |
| 5,825,772 A | 10/1998 | Dobbins et al. |
| 5,832,283 A | 11/1998 | Chou et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,875,296 A | 2/1999 | Shi et al. |
| 5,884,303 A | 3/1999 | Brown |
| 5,892,914 A | 4/1999 | Pitts |
| 5,892,932 A | 4/1999 | Kim |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,919,247 A | 7/1999 | Van Hoff et al. |
| 5,920,873 A | 7/1999 | Van Huben et al. |
| 5,936,939 A | 8/1999 | Des Jardins et al. |
| 5,937,406 A | 8/1999 | Balabine et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,958,053 A | 9/1999 | Denker |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 5,991,302 A | 11/1999 | Beri et al. |
| 5,995,491 A | 11/1999 | Richter et al. |
| 5,999,664 A | 12/1999 | Mahoney et al. |
| 6,006,260 A | 12/1999 | Barrick, Jr. et al. |
| 6,006,264 A | 12/1999 | Colby et al. |
| 6,012,083 A | 1/2000 | Savitzky et al. |
| 6,026,452 A | 2/2000 | Pitts |
| 6,028,857 A | 2/2000 | Poor |
| 6,029,168 A | 2/2000 | Frey |
| 6,029,175 A | 2/2000 | Chow et al. |
| 6,038,233 A | 3/2000 | Hamamoto et al. |
| 6,041,365 A | 3/2000 | Kleinerman |
| 6,044,367 A | 3/2000 | Wolff |
| 6,047,129 A | 4/2000 | Frye |
| 6,051,169 A | 4/2000 | Brown et al. |
| 6,067,558 A | 5/2000 | Wendt et al. |
| 6,072,942 A | 6/2000 | Stockwell et al. |
| 6,078,929 A | 6/2000 | Rao |
| 6,078,956 A | 6/2000 | Bryant et al. |
| 6,085,234 A | 7/2000 | Pitts et al. |
| 6,088,694 A | 7/2000 | Burns et al. |
| 6,092,196 A | 7/2000 | Reiche |
| 6,104,706 A | 8/2000 | Richter et al. |
| 6,108,703 A | 8/2000 | Leighton et al. |
| 6,111,876 A | 8/2000 | Frantz et al. |
| 6,118,784 A | 9/2000 | Tsuchiya et al. |
| 6,119,234 A | 9/2000 | Aziz et al. |
| 6,128,279 A | 10/2000 | O'Neil et al. |
| 6,128,627 A | 10/2000 | Mattis et al. |
| 6,128,657 A | 10/2000 | Okanoya et al. |
| 6,128,717 A | 10/2000 | Harrison et al. |
| 6,154,777 A | 11/2000 | Ebrahim |
| 6,160,874 A | 12/2000 | Dickerman et al. |
| 6,161,145 A | 12/2000 | Bainbridge et al. |
| 6,161,185 A | 12/2000 | Guthrie et al. |
| 6,170,022 B1 | 1/2001 | Linville et al. |
| 6,178,423 B1 | 1/2001 | Douceur et al. |
| 6,181,336 B1 | 1/2001 | Chiu et al. |
| 6,182,139 B1 | 1/2001 | Brendel |
| 6,192,051 B1 | 2/2001 | Lipman et al. |
| 6,202,156 B1 | 3/2001 | Kalajan |
| 6,223,206 B1 | 4/2001 | Dan et al. |
| 6,233,612 B1 | 5/2001 | Fruchtman et al. |
| 6,233,648 B1 | 5/2001 | Tomita |
| 6,237,008 B1 | 5/2001 | Beal et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,256,031 B1 | 7/2001 | Meijer et al. |
| 6,259,405 B1 | 7/2001 | Stewart et al. |
| 6,260,070 B1 | 7/2001 | Shah |
| 6,263,368 B1 | 7/2001 | Martin |
| 6,282,610 B1 | 8/2001 | Bergsten |
| 6,289,012 B1 | 9/2001 | Harrington et al. |
| 6,289,345 B1 | 9/2001 | Yasue |
| 6,292,832 B1 | 9/2001 | Shah et al. |
| 6,298,380 B1 | 10/2001 | Coile et al. |
| 6,304,913 B1 | 10/2001 | Rune |
| 6,308,162 B1 | 10/2001 | Ouimet et al. |
| 6,324,581 B1 | 11/2001 | Xu et al. |
| 6,327,622 B1 | 12/2001 | Jindal et al. |
| 6,330,574 B1 | 12/2001 | Murashita |
| 6,338,082 B1 | 1/2002 | Schneider |
| 6,339,785 B1 | 1/2002 | Feigenbaum |
| 6,343,324 B1 | 1/2002 | Hubis et al. |
| 6,347,339 B1 | 2/2002 | Morris et al. |
| 6,349,343 B1 | 2/2002 | Foody et al. |
| 6,353,848 B1 | 3/2002 | Morris |
| 6,360,270 B1 | 3/2002 | Cherkasova et al. |
| 6,363,056 B1 | 3/2002 | Beigi et al. |
| 6,367,009 B1 | 4/2002 | Davis et al. |
| 6,370,527 B1 | 4/2002 | Singhal |
| 6,374,263 B1 | 4/2002 | Bunger et al. |
| 6,374,300 B2 | 4/2002 | Masters |
| 6,389,433 B1 | 5/2002 | Bolosky et al. |
| 6,389,462 B1 | 5/2002 | Cohen et al. |
| 6,393,581 B1 | 5/2002 | Friedman et al. |
| 6,396,833 B1 | 5/2002 | Zhang et al. |
| 6,397,246 B1 | 5/2002 | Wolfe |
| 6,412,004 B1 | 6/2002 | Chen et al. |
| 6,430,562 B1 | 8/2002 | Kardos et al. |
| 6,434,081 B1 | 8/2002 | Johnson et al. |

(56) References Cited

U.S. PATENT DOCUMENTS

| | | |
|---|---|---|
| 6,438,595 B1 | 8/2002 | Blumenau et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,480,476 B1 | 11/2002 | Willars |
| 6,484,261 B1 | 11/2002 | Wiegel |
| 6,487,561 B1 | 11/2002 | Ofek et al. |
| 6,490,624 B1 | 12/2002 | Sampson et al. |
| 6,493,804 B1 | 12/2002 | Soltis et al. |
| 6,510,135 B1 | 1/2003 | Almulhem et al. |
| 6,510,458 B1 | 1/2003 | Berstis et al. |
| 6,513,061 B1 | 1/2003 | Ebata et al. |
| 6,514,085 B2 | 2/2003 | Slattery et al. |
| 6,516,350 B1 | 2/2003 | Lumelsky et al. |
| 6,516,351 B2 | 2/2003 | Borr |
| 6,519,643 B1 | 2/2003 | Foulkes et al. |
| 6,542,936 B1 | 4/2003 | Mayle et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,578,069 B1 | 6/2003 | Hopmann et al. |
| 6,580,717 B1 | 6/2003 | Higuchi et al. |
| 6,601,084 B1 | 7/2003 | Bhaskaran et al. |
| 6,601,101 B1 | 7/2003 | Lee et al. |
| 6,606,663 B1 | 8/2003 | Liao et al. |
| 6,612,490 B1 | 9/2003 | Herrendoerfer et al. |
| 6,615,267 B1 | 9/2003 | Whalen et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,346 B1 | 11/2003 | Mahalingaiah et al. |
| 6,654,701 B2 | 11/2003 | Hatley |
| 6,661,802 B1 | 12/2003 | Homberg et al. |
| 6,683,873 B1 | 1/2004 | Kwok et al. |
| 6,690,669 B1 | 2/2004 | Tsuchiya et al. |
| 6,691,165 B1 | 2/2004 | Bruck et al. |
| 6,694,517 B1 | 2/2004 | James et al. |
| 6,701,415 B1 | 3/2004 | Hendren, III |
| 6,708,187 B1 | 3/2004 | Shanumgam et al. |
| 6,718,380 B1 | 4/2004 | Mohaban et al. |
| 6,721,794 B2 | 4/2004 | Taylor et al. |
| 6,728,704 B2 | 4/2004 | Mao et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,742,045 B1 | 5/2004 | Albert et al. |
| 6,744,776 B1 | 6/2004 | Kalkunte et al. |
| 6,748,420 B1 | 6/2004 | Quatrano et al. |
| 6,751,663 B1 | 6/2004 | Farrell et al. |
| 6,754,215 B1 | 6/2004 | Arikawa et al. |
| 6,754,228 B1 | 6/2004 | Ludwig |
| 6,754,699 B2 | 6/2004 | Swildens et al. |
| 6,757,706 B1 | 6/2004 | Dong et al. |
| 6,760,337 B1 | 7/2004 | Snyder, II et al. |
| 6,760,775 B1 | 7/2004 | Anerousis et al. |
| 6,772,219 B1 | 8/2004 | Shobatake |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,779,039 B1 | 8/2004 | Bommareddy et al. |
| 6,781,986 B1 | 8/2004 | Sabaa et al. |
| 6,782,450 B2 | 8/2004 | Arnott et al. |
| 6,795,860 B1 | 9/2004 | Shah |
| 6,798,777 B1 | 9/2004 | Ferguson et al. |
| 6,801,960 B1 | 10/2004 | Ericson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,826,613 B1 | 11/2004 | Wang et al. |
| 6,829,238 B2 | 12/2004 | Tokuyo et al. |
| 6,839,761 B2 | 1/2005 | Kadyk et al. |
| 6,839,850 B1 | 1/2005 | Campbell et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,865,593 B1 | 3/2005 | Reshef et al. |
| 6,868,082 B1 | 3/2005 | Allen, Jr. et al. |
| 6,868,447 B1 | 3/2005 | Slaughter et al. |
| 6,871,221 B1 | 3/2005 | Styles |
| 6,871,245 B2 | 3/2005 | Bradley |
| 6,876,629 B2 | 4/2005 | Beshai et al. |
| 6,876,654 B1 | 4/2005 | Hegde |
| 6,880,017 B1 | 4/2005 | Marce et al. |
| 6,883,137 B1 | 4/2005 | Girardot et al. |
| 6,888,836 B1 | 5/2005 | Cherkasova |
| 6,889,249 B2 | 5/2005 | Miloushev et al. |
| 6,907,037 B2 | 6/2005 | Tsuchiya et al. |
| 6,912,219 B2 | 6/2005 | Tsuchiya et al. |
| 6,914,881 B1 | 7/2005 | Mansfield et al. |
| 6,920,136 B2 | 7/2005 | Tsuchiya et al. |
| 6,920,137 B2 | 7/2005 | Tsuchiya et al. |
| 6,920,138 B2 | 7/2005 | Tsuchiya et al. |
| 6,922,688 B1 | 7/2005 | Frey, Jr. |
| 6,928,077 B2 | 8/2005 | Tsuchiya et al. |
| 6,928,082 B2 | 8/2005 | Liu et al. |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,373 B2 | 10/2005 | Testardi |
| 6,959,394 B1 | 10/2005 | Brickell et al. |
| 6,961,815 B2 | 11/2005 | Kistler et al. |
| 6,970,924 B1 | 11/2005 | Chu et al. |
| 6,973,455 B1 | 12/2005 | Vahalia et al. |
| 6,973,490 B1 | 12/2005 | Robertson et al. |
| 6,973,549 B1 | 12/2005 | Testardi |
| 6,975,592 B1 | 12/2005 | Seddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,986,040 B1 | 1/2006 | Kramer et al. |
| 6,987,763 B2 | 1/2006 | Rochberger et al. |
| 6,990,074 B2 | 1/2006 | Wan et al. |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 7,003,533 B2 | 2/2006 | Noguchi et al. |
| 7,003,564 B2 | 2/2006 | Greuel et al. |
| 7,006,981 B2 | 2/2006 | Rose et al. |
| 7,007,092 B2 | 2/2006 | Peiffer |
| 7,010,553 B2 | 3/2006 | Chen et al. |
| 7,013,379 B1 | 3/2006 | Testardi |
| 7,020,644 B2 | 3/2006 | Jameson |
| 7,020,699 B2 | 3/2006 | Zhang et al. |
| 7,023,974 B1 | 4/2006 | Brannam et al. |
| 7,024,427 B2 | 4/2006 | Bobbitt et al. |
| 7,028,182 B1 | 4/2006 | Kilicommons |
| 7,039,061 B2 | 5/2006 | Connor et al. |
| 7,051,112 B2 | 5/2006 | Dawson |
| 7,054,998 B2 | 5/2006 | Arnott et al. |
| 7,058,633 B1 | 6/2006 | Gnagy et al. |
| 7,065,482 B2 | 6/2006 | Shorey et al. |
| 7,072,338 B2 | 7/2006 | Tsuchiya et al. |
| 7,072,339 B2 | 7/2006 | Tsuchiya et al. |
| 7,072,917 B2 | 7/2006 | Wong et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,088,726 B1 | 8/2006 | Hamamoto et al. |
| 7,089,286 B1 | 8/2006 | Malik |
| 7,089,491 B2 | 8/2006 | Feinberg et al. |
| 7,111,115 B2 | 9/2006 | Peters et al. |
| 7,113,962 B1 | 9/2006 | Kee et al. |
| 7,113,993 B1 | 9/2006 | Cappiello et al. |
| 7,113,996 B2 | 9/2006 | Kronenberg |
| 7,120,128 B2 | 10/2006 | Banks et al. |

(56) References Cited

U.S. PATENT DOCUMENTS

| | | |
|---|---|---|
| 7,120,746 B2 | 10/2006 | Campbell et al. |
| 7,127,556 B2 | 10/2006 | Blumenau et al. |
| 7,133,863 B2 | 11/2006 | Teng et al. |
| 7,133,944 B2 | 11/2006 | Song et al. |
| 7,133,967 B2 | 11/2006 | Fujie et al. |
| 7,139,792 B1 | 11/2006 | Mishra et al. |
| 7,143,146 B2 | 11/2006 | Nakatani et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,158,526 B2 | 1/2007 | Higuchi et al. |
| 7,162,529 B2 | 1/2007 | Morishige et al. |
| 7,165,095 B2 | 1/2007 | Sim |
| 7,167,821 B2 | 1/2007 | Hardwick et al. |
| 7,171,496 B2 | 1/2007 | Tanaka et al. |
| 7,173,929 B1 | 2/2007 | Testardi |
| 7,185,359 B2 | 2/2007 | Schmidt et al. |
| 7,191,163 B2 | 3/2007 | Herrera et al. |
| 7,193,998 B2 | 3/2007 | Tsuchiya et al. |
| 7,194,579 B2 | 3/2007 | Robinson et al. |
| 7,209,759 B1 | 4/2007 | Billing et al. |
| 7,228,359 B1 | 6/2007 | Monteiro |
| 7,228,422 B2 | 6/2007 | Morioka et al. |
| 7,234,074 B2 | 6/2007 | Cohn et al. |
| 7,236,491 B2 | 6/2007 | Tsao et al. |
| 7,240,100 B1 | 7/2007 | Wein et al. |
| 7,248,591 B2 | 7/2007 | Hamamoto et al. |
| 7,251,247 B2 | 7/2007 | Hamamoto et al. |
| 7,280,536 B2 | 10/2007 | Testardi |
| 7,280,971 B1 | 10/2007 | Wimberly et al. |
| 7,283,540 B2 | 10/2007 | Hamamoto et al. |
| 7,284,150 B2 | 10/2007 | Ma et al. |
| 7,287,082 B1 | 10/2007 | O'Toole, Jr. |
| 7,292,541 B1 | 11/2007 | C S |
| 7,293,097 B2 | 11/2007 | Borr |
| 7,293,099 B1 | 11/2007 | Kalajan |
| 7,293,133 B1 | 11/2007 | Colgrove et al. |
| 7,295,827 B2 | 11/2007 | Liu et al. |
| 7,296,263 B1 | 11/2007 | Jacob |
| 7,299,491 B2 | 11/2007 | Shelest et al. |
| 7,305,480 B2 | 12/2007 | Oishi et al. |
| 7,308,475 B1 | 12/2007 | Pruitt et al. |
| 7,308,703 B2 | 12/2007 | Wright et al. |
| 7,308,709 B1 | 12/2007 | Brezak et al. |
| 7,310,339 B1 | 12/2007 | Powers et al. |
| 7,315,543 B2 | 1/2008 | Takeuchi et al. |
| 7,319,696 B2 | 1/2008 | Inoue et al. |
| 7,321,926 B1 | 1/2008 | Zhang et al. |
| 7,324,533 B1 | 1/2008 | DeLiberato et al. |
| 7,328,009 B2 | 2/2008 | Takeda et al. |
| 7,328,281 B2 | 2/2008 | Takeda et al. |
| 7,333,999 B1 | 2/2008 | Njemanze |
| 7,343,398 B1 | 3/2008 | Lownsbrough |
| 7,343,413 B2 | 3/2008 | Gilde et al. |
| 7,346,664 B2 | 3/2008 | Wong et al. |
| 7,349,391 B2 | 3/2008 | Ben-Dor et al. |
| 7,383,288 B2 | 6/2008 | Miloushev et al. |
| 7,383,570 B2 | 6/2008 | Pinkas et al. |
| 7,385,989 B2 | 6/2008 | Higuchi et al. |
| 7,394,804 B2 | 7/2008 | Miyata et al. |
| 7,398,552 B2 | 7/2008 | Pardee et al. |
| 7,400,645 B2 | 7/2008 | Tsuchiya et al. |
| 7,400,646 B2 | 7/2008 | Tsuchiya et al. |
| 7,401,220 B2 | 7/2008 | Bolosky et al. |
| 7,403,520 B2 | 7/2008 | Tsuchiya et al. |
| 7,406,484 B1 | 7/2008 | Srinivasan et al. |
| 7,409,440 B1 | 8/2008 | Jacob |
| 7,415,488 B1 | 8/2008 | Muth et al. |
| 7,415,608 B2 | 8/2008 | Bolosky et al. |
| 7,433,962 B2 | 10/2008 | Janssen et al. |
| 7,437,478 B2 | 10/2008 | Yokota et al. |
| 7,440,982 B2 | 10/2008 | Lu et al. |
| 7,441,429 B1 | 10/2008 | Nucci et al. |
| 7,454,480 B2 | 11/2008 | Labio et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Sasaki et al. |
| 7,490,162 B1 | 2/2009 | Masters |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,509,322 B2 | 3/2009 | Miloushev et al. |
| 7,512,673 B2 | 3/2009 | Miloushev et al. |
| 7,516,492 B1 | 4/2009 | Nisbet et al. |
| 7,519,813 B1 | 4/2009 | Cox et al. |
| 7,522,581 B2 | 4/2009 | Acharya et al. |
| 7,526,541 B2 | 4/2009 | Roese et al. |
| 7,558,197 B1 | 7/2009 | Sindhu et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,577,141 B2 | 8/2009 | Kamata et al. |
| 7,577,723 B2 | 8/2009 | Matsuda et al. |
| 7,580,971 B1 | 8/2009 | Gollapudi et al. |
| 7,587,471 B2 | 9/2009 | Yasuda et al. |
| 7,590,732 B2 | 9/2009 | Rune |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,620,733 B1 | 11/2009 | Tzakikario et al. |
| 7,624,109 B2 | 11/2009 | Testardi |
| 7,624,424 B2 | 11/2009 | Morita et al. |
| 7,639,883 B2 | 12/2009 | Gill |
| 7,644,109 B2 | 1/2010 | Manley et al. |
| 7,644,137 B2 | 1/2010 | Bozak et al. |
| 7,653,077 B2 | 1/2010 | Hamamoto et al. |
| 7,653,699 B1 | 1/2010 | Colgrove et al. |
| 7,668,166 B1 | 2/2010 | Rekhter et al. |
| 7,689,596 B2 | 3/2010 | Tsunoda |
| 7,689,710 B2 | 3/2010 | Tang et al. |
| 7,694,082 B2 | 4/2010 | Golding et al. |
| 7,701,952 B2 | 4/2010 | Higuchi et al. |
| 7,711,771 B2 | 5/2010 | Kirnos |
| 7,724,657 B2 | 5/2010 | Rao et al. |
| 7,725,093 B2 | 5/2010 | Sengupta et al. |
| 7,734,603 B1 | 6/2010 | McManis |
| 7,743,035 B2 | 6/2010 | Chen et al. |
| 7,746,863 B2 | 6/2010 | Tsuchiya et al. |
| 7,752,294 B2 | 7/2010 | Meyer et al. |
| 7,761,597 B2 | 7/2010 | Takeda et al. |
| 7,769,711 B2 | 8/2010 | Srinivasan et al. |
| 7,778,187 B2 | 8/2010 | Chaturvedi et al. |
| 7,788,335 B2 | 8/2010 | Miloushev et al. |
| 7,788,408 B2 | 8/2010 | Takeda et al. |
| 7,801,978 B1 | 9/2010 | Susai et al. |
| 7,808,913 B2 | 10/2010 | Ansari et al. |
| 7,822,939 B1 | 10/2010 | Veprinsky et al. |
| 7,831,639 B1 | 11/2010 | Panchbudhe et al. |
| 7,831,662 B2 | 11/2010 | Clark et al. |
| 7,849,112 B2 | 12/2010 | Mane et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,908,245 B2 | 3/2011 | Nakano et al. |
| 7,908,314 B2 | 3/2011 | Yamaguchi et al. |
| 7,913,053 B1 | 3/2011 | Newland |
| 7,921,211 B2 | 4/2011 | Larson et al. |
| 7,925,908 B2 | 4/2011 | Kim |
| 7,930,365 B2 | 4/2011 | Dixit et al. |
| 7,933,946 B2 | 4/2011 | Livshits et al. |
| 7,941,517 B2 | 5/2011 | Migault et al. |
| 7,941,563 B2 | 5/2011 | Takeda et al. |
| 7,945,908 B1 | 5/2011 | Waldspurger et al. |
| 7,953,701 B2 | 5/2011 | Okitsu et al. |
| 7,957,405 B2 | 6/2011 | Higuchi et al. |
| 7,958,347 B1 | 6/2011 | Ferguson |
| 7,965,724 B2 | 6/2011 | Hamamoto et al. |
| 7,984,141 B2 | 7/2011 | Gupta et al. |
| 8,005,953 B2 | 8/2011 | Miloushev et al. |
| 8,031,716 B2 | 10/2011 | Tsuchiya et al. |
| 8,069,225 B2 | 11/2011 | McCann et al. |
| 8,103,781 B1 | 1/2012 | Wu et al. |

(56) References Cited

U.S. PATENT DOCUMENTS

| | | |
|---|---|---|
| 8,107,471 B2 | 1/2012 | Nakamura et al. |
| 8,130,650 B2 | 3/2012 | Allen, Jr. et al. |
| 8,131,863 B2 | 3/2012 | Takeda et al. |
| 8,189,567 B2 | 5/2012 | Kavanagh et al. |
| 8,199,757 B2 | 6/2012 | Pani et al. |
| 8,205,246 B2 | 6/2012 | Shatzkamer et al. |
| 8,239,954 B2 | 8/2012 | Wobber et al. |
| 8,266,427 B2 | 9/2012 | Thubert et al. |
| 8,274,895 B2 | 9/2012 | Rahman et al. |
| 8,281,383 B2 | 10/2012 | Levy-Abegnoli et al. |
| 8,289,968 B1 | 10/2012 | Zhuang |
| 8,321,908 B2 | 11/2012 | Gai et al. |
| 8,351,333 B2 | 1/2013 | Rao et al. |
| 8,379,640 B2 | 2/2013 | Ichihashi et al. |
| 8,380,854 B2 | 2/2013 | Szabo |
| 8,417,817 B1 | 4/2013 | Jacobs |
| 8,437,345 B2 | 5/2013 | Takeda et al. |
| 8,447,871 B1 | 5/2013 | Szabo |
| 8,447,970 B2 | 5/2013 | Klein et al. |
| 8,464,265 B2 | 6/2013 | Worley |
| 8,468,267 B2 | 6/2013 | Yigang |
| 8,477,804 B2 | 7/2013 | Yoshimoto et al. |
| 8,488,465 B2 | 7/2013 | Solis et al. |
| 8,494,485 B1 * | 7/2013 | Broch ............... H04L 9/3263 455/410 |
| 8,539,224 B2 | 9/2013 | Henderson et al. |
| 8,566,474 B2 | 10/2013 | Kanode et al. |
| 8,578,050 B2 | 11/2013 | Craig et al. |
| 8,582,599 B2 | 11/2013 | Hamamoto et al. |
| 8,594,108 B2 | 11/2013 | Tsuchiya et al. |
| 8,601,161 B2 | 12/2013 | Takeda et al. |
| 8,606,921 B2 | 12/2013 | Vasquez et al. |
| 8,615,022 B2 | 12/2013 | Harrison et al. |
| 8,646,067 B2 | 2/2014 | Agarwal et al. |
| 8,665,868 B2 | 3/2014 | Kay |
| 8,665,969 B2 | 3/2014 | Kay |
| 8,701,179 B1 | 4/2014 | Penno et al. |
| 8,725,836 B2 | 5/2014 | Lowery et al. |
| 8,726,336 B2 | 5/2014 | Narayanaswamy et al. |
| 8,726,338 B2 | 5/2014 | Narayanaswamy et al. |
| 8,737,304 B2 | 5/2014 | Karuturi et al. |
| 8,788,665 B2 | 7/2014 | Glide et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,819,768 B1 | 8/2014 | Koeten et al. |
| 8,830,874 B2 | 9/2014 | Cho et al. |
| 8,873,753 B2 | 10/2014 | Parker |
| 8,875,274 B2 | 10/2014 | Montemurro et al. |
| 8,886,981 B1 | 11/2014 | Baumann et al. |
| 8,908,545 B1 | 12/2014 | Chen et al. |
| 8,954,080 B2 | 2/2015 | Janakiriman et al. |
| 9,037,166 B2 | 5/2015 | de Wit et al. |
| 9,077,554 B1 | 7/2015 | Szabo |
| 9,083,760 B1 | 7/2015 | Hughes et al. |
| 9,088,525 B2 | 7/2015 | Takeda et al. |
| 9,106,699 B2 | 8/2015 | Thornewell et al. |
| 9,641,344 B1 * | 5/2017 | Kim ............... H04L 9/30 |
| 2001/0007560 A1 | 7/2001 | Masuda et al. |
| 2001/0009554 A1 | 7/2001 | Katseff et al. |
| 2001/0014891 A1 | 8/2001 | Hoffert et al. |
| 2001/0023442 A1 | 9/2001 | Masters |
| 2001/0047293 A1 | 11/2001 | Waller et al. |
| 2001/0051955 A1 | 12/2001 | Wong |
| 2002/0010783 A1 | 1/2002 | Primak et al. |
| 2002/0012352 A1 | 1/2002 | Hansson et al. |
| 2002/0032777 A1 | 3/2002 | Kawata et al. |
| 2002/0035537 A1 | 3/2002 | Waller et al. |
| 2002/0038360 A1 | 3/2002 | Andrews et al. |
| 2002/0049842 A1 | 4/2002 | Huetsch et al. |
| 2002/0059263 A1 | 5/2002 | Shima et al. |
| 2002/0059428 A1 | 5/2002 | Susai et al. |
| 2002/0065810 A1 | 5/2002 | Bradley |
| 2002/0065848 A1 | 5/2002 | Walker et al. |
| 2002/0073105 A1 | 6/2002 | Noguchi et al. |
| 2002/0083067 A1 | 6/2002 | Tamayo et al. |
| 2002/0083118 A1 | 6/2002 | Sim |
| 2002/0087571 A1 | 7/2002 | Stapel et al. |
| 2002/0087744 A1 | 7/2002 | Kitchin |
| 2002/0087887 A1 | 7/2002 | Busam et al. |
| 2002/0099829 A1 | 7/2002 | Richards et al. |
| 2002/0103823 A1 | 8/2002 | Jackson et al. |
| 2002/0103916 A1 | 8/2002 | Chen et al. |
| 2002/0112061 A1 | 8/2002 | Shih et al. |
| 2002/0133330 A1 | 9/2002 | Loisey et al. |
| 2002/0133491 A1 | 9/2002 | Sim et al. |
| 2002/0138615 A1 | 9/2002 | Schmeling |
| 2002/0143819 A1 | 10/2002 | Han et al. |
| 2002/0143909 A1 | 10/2002 | Botz et al. |
| 2002/0147630 A1 | 10/2002 | Rose et al. |
| 2002/0150253 A1 | 10/2002 | Brezak et al. |
| 2002/0156905 A1 | 10/2002 | Weissman |
| 2002/0160161 A1 | 10/2002 | Misuda |
| 2002/0161911 A1 | 10/2002 | Pinckney, III et al. |
| 2002/0161913 A1 | 10/2002 | Gonzalez et al. |
| 2002/0162118 A1 | 10/2002 | Levy et al. |
| 2002/0174216 A1 | 11/2002 | Shorey et al. |
| 2002/0188667 A1 | 12/2002 | Kirnos |
| 2002/0194112 A1 | 12/2002 | dePinto et al. |
| 2002/0194342 A1 | 12/2002 | Lu et al. |
| 2002/0198956 A1 | 12/2002 | Dunshea et al. |
| 2002/0198993 A1 | 12/2002 | Cudd et al. |
| 2003/0005172 A1 | 1/2003 | Chessell |
| 2003/0009429 A1 | 1/2003 | Jameson |
| 2003/0009528 A1 | 1/2003 | Sharif et al. |
| 2003/0012382 A1 | 1/2003 | Ferchichi et al. |
| 2003/0018450 A1 | 1/2003 | Carley |
| 2003/0018585 A1 | 1/2003 | Butler et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0037070 A1 | 2/2003 | Marston |
| 2003/0046291 A1 | 3/2003 | Fascenda |
| 2003/0055723 A1 | 3/2003 | English |
| 2003/0061240 A1 | 3/2003 | McCann et al. |
| 2003/0065951 A1 | 4/2003 | Igeta et al. |
| 2003/0065956 A1 | 4/2003 | Belapurkar et al. |
| 2003/0067923 A1 | 4/2003 | Ju et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0074301 A1 | 4/2003 | Solomon |
| 2003/0074434 A1 | 4/2003 | Jason et al. |
| 2003/0086415 A1 | 5/2003 | Bernhard et al. |
| 2003/0105846 A1 | 6/2003 | Zhao et al. |
| 2003/0105983 A1 | 6/2003 | Brakimo et al. |
| 2003/0108052 A1 | 6/2003 | Inoue et al. |
| 2003/0115218 A1 | 6/2003 | Bobbitt et al. |
| 2003/0115439 A1 | 6/2003 | Mahalingam et al. |
| 2003/0128708 A1 | 7/2003 | Inoue et al. |
| 2003/0130945 A1 | 7/2003 | Force et al. |
| 2003/0139934 A1 | 7/2003 | Mandera |
| 2003/0140140 A1 | 7/2003 | Lahtinen |
| 2003/0145062 A1 | 7/2003 | Sharma et al. |
| 2003/0145233 A1 | 7/2003 | Poletto et al. |
| 2003/0149781 A1 | 8/2003 | Yared et al. |
| 2003/0156586 A1 | 8/2003 | Lee et al. |
| 2003/0159072 A1 | 8/2003 | Bellinger et al. |
| 2003/0163576 A1 | 8/2003 | Janssen et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0191812 A1 | 10/2003 | Agarwalla et al. |
| 2003/0195813 A1 | 10/2003 | Pallister et al. |
| 2003/0204635 A1 | 10/2003 | Ko et al. |
| 2003/0212954 A1 | 11/2003 | Patrudu |
| 2003/0220835 A1 | 11/2003 | Barnes, Jr. |
| 2003/0221000 A1 | 11/2003 | Cherkasova et al. |
| 2003/0225485 A1 | 12/2003 | Fritz et al. |
| 2003/0229665 A1 | 12/2003 | Ryman |
| 2003/0236995 A1 | 12/2003 | Fretwell, Jr. |
| 2004/0003266 A1 | 1/2004 | Moshir et al. |
| 2004/0003287 A1 | 1/2004 | Zissimopoulos et al. |

(56) References Cited

U.S. PATENT DOCUMENTS

| | | |
|---|---|---|
| 2004/0006575 A1 | 1/2004 | Visharam et al. |
| 2004/0006591 A1 | 1/2004 | Matsui et al. |
| 2004/0010654 A1 | 1/2004 | Yasuda et al. |
| 2004/0015783 A1 | 1/2004 | Lennon et al. |
| 2004/0017825 A1 | 1/2004 | Stanwood et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030627 A1 | 2/2004 | Sedukhin |
| 2004/0030740 A1 | 2/2004 | Stelting |
| 2004/0030857 A1 | 2/2004 | Krakirian et al. |
| 2004/0043758 A1 | 3/2004 | Sorvari et al. |
| 2004/0054777 A1 | 3/2004 | Ackaouy et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0072569 A1 | 4/2004 | Omae et al. |
| 2004/0093474 A1 | 5/2004 | Lin et al. |
| 2004/0098383 A1 | 5/2004 | Tabellion et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0133606 A1 | 7/2004 | Miloushev et al. |
| 2004/0138858 A1 | 7/2004 | Carley |
| 2004/0139355 A1 | 7/2004 | Axel et al. |
| 2004/0148380 A1 | 7/2004 | Meyer et al. |
| 2004/0141185 A1 | 8/2004 | Akama |
| 2004/0151186 A1 | 8/2004 | Akama |
| 2004/0153479 A1 | 8/2004 | Mikesell et al. |
| 2004/0167967 A1 | 8/2004 | Bastian et al. |
| 2004/0181605 A1 | 9/2004 | Nakatani et al. |
| 2004/0192312 A1 | 9/2004 | Li et al. |
| 2004/0199547 A1 | 10/2004 | Winter et al. |
| 2004/0213156 A1 | 10/2004 | Smallwood et al. |
| 2004/0215665 A1 | 10/2004 | Edgar et al. |
| 2004/0236798 A1 | 11/2004 | Srinivasan et al. |
| 2004/0236826 A1 | 11/2004 | Harville et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0021615 A1 | 1/2005 | Arnott et al. |
| 2005/0021703 A1 | 1/2005 | Cherry et al. |
| 2005/0021736 A1 | 1/2005 | Carusi et al. |
| 2005/0027841 A1 | 2/2005 | Rolfe |
| 2005/0027869 A1 | 2/2005 | Johnson |
| 2005/0028010 A1 | 2/2005 | Wallman |
| 2005/0044158 A1 | 2/2005 | Malik |
| 2005/0044213 A1 | 2/2005 | Kobayashi et al. |
| 2005/0050107 A1 | 3/2005 | Mane et al. |
| 2005/0052440 A1 | 3/2005 | Kim et al. |
| 2005/0055435 A1 | 3/2005 | Gbadegesin et al. |
| 2005/0078604 A1 | 4/2005 | Yim |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0114701 A1 | 5/2005 | Atkins et al. |
| 2005/0117589 A1 | 6/2005 | Douady et al. |
| 2005/0122977 A1 | 6/2005 | Lieberman |
| 2005/0125195 A1 | 6/2005 | Brendel |
| 2005/0154837 A1 | 7/2005 | Keohane et al. |
| 2005/0165656 A1 | 7/2005 | Frederick et al. |
| 2005/0175013 A1 | 8/2005 | Le Pennec et al. |
| 2005/0187866 A1 | 8/2005 | Lee |
| 2005/0187934 A1 | 8/2005 | Motsinger et al. |
| 2005/0188220 A1 | 8/2005 | Nilsson et al. |
| 2005/0188423 A1 | 8/2005 | Motsinger et al. |
| 2005/0189501 A1 | 9/2005 | Sato et al. |
| 2005/0198234 A1 | 9/2005 | Leib et al. |
| 2005/0198310 A1 | 9/2005 | Kim et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0246393 A1 | 11/2005 | Coates et al. |
| 2005/0256806 A1 | 11/2005 | Tien et al. |
| 2005/0262238 A1 | 11/2005 | Reeves et al. |
| 2005/0277430 A1 | 12/2005 | Meisi |
| 2005/0289109 A1 | 12/2005 | Arrouye et al. |
| 2005/0289111 A1 | 12/2005 | Tribble et al. |
| 2006/0010502 A1 | 1/2006 | Mimatsu et al. |
| 2006/0031374 A1 | 2/2006 | Lu et al. |
| 2006/0031520 A1 | 2/2006 | Bedekar et al. |
| 2006/0045096 A1 | 3/2006 | Farmer et al. |
| 2006/0047785 A1 | 3/2006 | Wang et al. |
| 2006/0059267 A1 | 3/2006 | Cugi et al. |
| 2006/0075475 A1 | 4/2006 | Boulos et al. |
| 2006/0077902 A1 | 4/2006 | Kannan et al. |
| 2006/0080353 A1 | 4/2006 | Miloushev et al. |
| 2006/0095573 A1 | 5/2006 | Carle |
| 2006/0106882 A1 | 5/2006 | Douceur et al. |
| 2006/0112151 A1 | 5/2006 | Manley et al. |
| 2006/0112176 A1 | 5/2006 | Liu et al. |
| 2006/0112272 A1 | 5/2006 | Morioka et al. |
| 2006/0112367 A1 | 5/2006 | Harris |
| 2006/0123062 A1 | 6/2006 | Bobbitt et al. |
| 2006/0129684 A1 | 6/2006 | Datta |
| 2006/0135198 A1 | 6/2006 | Lee |
| 2006/0140193 A1 | 6/2006 | Kakani et al. |
| 2006/0153201 A1 | 7/2006 | Hepper et al. |
| 2006/0156416 A1 | 7/2006 | Huotari et al. |
| 2006/0161577 A1 | 7/2006 | Kulkarni et al. |
| 2006/0167838 A1 | 7/2006 | Lacapra |
| 2006/0171365 A1 | 8/2006 | Borella |
| 2006/0179261 A1 | 8/2006 | Rajan |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0209853 A1 | 9/2006 | Hidaka et al. |
| 2006/0212746 A1 | 9/2006 | Amegadzie et al. |
| 2006/0224687 A1 | 10/2006 | Popkin et al. |
| 2006/0230148 A1 | 10/2006 | Forecast et al. |
| 2006/0230265 A1 | 10/2006 | Krishna |
| 2006/0233106 A1 | 10/2006 | Achlioptas et al. |
| 2006/0242179 A1 | 10/2006 | Chen et al. |
| 2006/0242300 A1 | 10/2006 | Yumoto et al. |
| 2006/0259320 A1 | 11/2006 | LaSalle et al. |
| 2006/0259949 A1 | 11/2006 | Schaefer et al. |
| 2006/0268692 A1 | 11/2006 | Wright et al. |
| 2006/0271598 A1 | 11/2006 | Wong et al. |
| 2006/0277225 A1 | 12/2006 | Mark et al. |
| 2006/0282442 A1 | 12/2006 | Lennon et al. |
| 2006/0282461 A1 | 12/2006 | Marinescu |
| 2006/0282471 A1 | 12/2006 | Mark et al. |
| 2006/0288413 A1 | 12/2006 | Kubota |
| 2007/0005807 A1 | 1/2007 | Wong |
| 2007/0006293 A1 | 1/2007 | Balakrishnan et al. |
| 2007/0016613 A1 | 1/2007 | Foresti et al. |
| 2007/0016662 A1 | 1/2007 | Desai et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0058670 A1 | 3/2007 | Konduru et al. |
| 2007/0064661 A1 | 3/2007 | Sood et al. |
| 2007/0083646 A1 | 4/2007 | Miller et al. |
| 2007/0088702 A1 | 4/2007 | Fridella et al. |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0118879 A1 | 5/2007 | Yeun |
| 2007/0124502 A1 | 5/2007 | Li |
| 2007/0124806 A1 | 5/2007 | Shulman et al. |
| 2007/0130255 A1 | 6/2007 | Wolovitz et al. |
| 2007/0136308 A1 | 6/2007 | Tsirigotis et al. |
| 2007/0136312 A1 | 6/2007 | Shulman et al. |
| 2007/0162891 A1 | 7/2007 | Burner et al. |
| 2007/0168320 A1 | 7/2007 | Borthakur et al. |
| 2007/0174491 A1 | 7/2007 | Still et al. |

(56) References Cited

U.S. PATENT DOCUMENTS

| | | |
|---|---|---|
| 2007/0208748 A1 | 9/2007 | Li |
| 2007/0209075 A1 | 9/2007 | Coffman |
| 2007/0214503 A1 | 9/2007 | Shulman et al. |
| 2007/0220598 A1 | 9/2007 | Salowey et al. |
| 2007/0226331 A1 | 9/2007 | Srinivasan et al. |
| 2007/0233809 A1 | 10/2007 | Brownell et al. |
| 2007/0233826 A1 | 10/2007 | Tindal et al. |
| 2007/0297410 A1 | 12/2007 | Yoon et al. |
| 2007/0297551 A1 | 12/2007 | Choi |
| 2008/0004022 A1 | 1/2008 | Johannesson et al. |
| 2008/0010372 A1 | 1/2008 | Khedouri et al. |
| 2008/0022059 A1 | 1/2008 | Zimmerer et al. |
| 2008/0025297 A1 | 1/2008 | Kashyap |
| 2008/0034136 A1 | 2/2008 | Ulenas |
| 2008/0046432 A1 | 2/2008 | Anderson et al. |
| 2008/0070575 A1 | 3/2008 | Claussen et al. |
| 2008/0072303 A1 | 3/2008 | Syed |
| 2008/0104443 A1 | 5/2008 | Akutsu et al. |
| 2008/0120370 A1 | 5/2008 | Chan et al. |
| 2008/0133518 A1 | 6/2008 | Kapoor et al. |
| 2008/0134311 A1 | 6/2008 | Medvinsky et al. |
| 2008/0137659 A1 | 6/2008 | Levy-Abegnoli et al. |
| 2008/0148340 A1 | 6/2008 | Powell et al. |
| 2008/0159145 A1 | 7/2008 | Muthukrishnan et al. |
| 2008/0178278 A1 | 7/2008 | Grinstein et al. |
| 2008/0201599 A1 | 8/2008 | Ferraiolo et al. |
| 2008/0205415 A1 | 8/2008 | Morales |
| 2008/0205613 A1 | 8/2008 | Lopez |
| 2008/0208933 A1 | 8/2008 | Lyon |
| 2008/0209073 A1 | 8/2008 | Tang |
| 2008/0222223 A1 | 9/2008 | Srinivasan et al. |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0243769 A1 | 10/2008 | Arbour et al. |
| 2008/0253395 A1 | 10/2008 | Pandya |
| 2008/0256224 A1 | 10/2008 | Kaji et al. |
| 2008/0270578 A1 | 10/2008 | Zhang et al. |
| 2008/0271132 A1 | 10/2008 | Jokela et al. |
| 2008/0275843 A1 | 11/2008 | Lal |
| 2008/0282047 A1 | 11/2008 | Arakawa et al. |
| 2008/0288661 A1 | 11/2008 | Galles |
| 2008/0301760 A1 | 12/2008 | Lim |
| 2008/0304457 A1 | 12/2008 | Thubert et al. |
| 2008/0320093 A1 | 12/2008 | Thorne |
| 2009/0007162 A1 | 1/2009 | Sheehan |
| 2009/0028337 A1 | 1/2009 | Balabine et al. |
| 2009/0037975 A1 | 2/2009 | Ishikawa et al. |
| 2009/0041230 A1 | 2/2009 | Williams |
| 2009/0049230 A1 | 2/2009 | Pandya |
| 2009/0055607 A1 | 2/2009 | Schack et al. |
| 2009/0070617 A1 | 3/2009 | Arimilli et al. |
| 2009/0077097 A1 | 3/2009 | Lacapra et al. |
| 2009/0077619 A1 | 3/2009 | Boyce |
| 2009/0089344 A1 | 4/2009 | Brown et al. |
| 2009/0094252 A1 | 4/2009 | Wong et al. |
| 2009/0094610 A1 | 4/2009 | Sukirya |
| 2009/0100518 A1 | 4/2009 | Overcash |
| 2009/0103524 A1 | 4/2009 | Mantripragada |
| 2009/0106255 A1 | 4/2009 | Lacapra et al. |
| 2009/0106263 A1 | 4/2009 | Khalid et al. |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0125955 A1 | 5/2009 | DeLorme |
| 2009/0132616 A1 | 5/2009 | Winter et al. |
| 2009/0138749 A1 | 5/2009 | Moll et al. |
| 2009/0141891 A1 | 6/2009 | Boyen et al. |
| 2009/0187649 A1 | 7/2009 | Migault et al. |
| 2009/0193115 A1 | 7/2009 | Sugita |
| 2009/0196282 A1 | 8/2009 | Fellman et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0228956 A1 | 9/2009 | He et al. |
| 2009/0254592 A1 | 10/2009 | Marinov et al. |
| 2009/0265396 A1 | 10/2009 | Ram et al. |
| 2009/0271865 A1 | 10/2009 | Jiang |
| 2009/0287935 A1 | 11/2009 | Aull et al. |
| 2009/0296624 A1 | 12/2009 | Ryu et al. |
| 2009/0300161 A1 | 12/2009 | Pruitt et al. |
| 2009/0300407 A1 | 12/2009 | Kamath et al. |
| 2010/0011434 A1 | 1/2010 | Kay |
| 2010/0017846 A1 | 1/2010 | Huang et al. |
| 2010/0023582 A1 | 1/2010 | Pedersen et al. |
| 2010/0034381 A1 | 2/2010 | Trace et al. |
| 2010/0036959 A1 | 2/2010 | Trace et al. |
| 2010/0061380 A1 | 3/2010 | Barach et al. |
| 2010/0064001 A1 | 3/2010 | Daily |
| 2010/0071048 A1 | 3/2010 | Novak et al. |
| 2010/0077462 A1 | 3/2010 | Joffe et al. |
| 2010/0115236 A1 | 5/2010 | Bataineh et al. |
| 2010/0122091 A1 | 5/2010 | Huang et al. |
| 2010/0142382 A1 | 6/2010 | Jungck et al. |
| 2010/0150154 A1 | 6/2010 | Viger et al. |
| 2010/0161774 A1 | 6/2010 | Huang et al. |
| 2010/0165877 A1 | 7/2010 | Shukla et al. |
| 2010/0179984 A1 | 7/2010 | Sebastian |
| 2010/0211547 A1 | 8/2010 | Kamei et al. |
| 2010/0217890 A1 | 8/2010 | Nice et al. |
| 2010/0228813 A1 | 9/2010 | Suzuki et al. |
| 2010/0242092 A1 | 9/2010 | Harris et al. |
| 2010/0251330 A1 | 9/2010 | Kroeselberg et al. |
| 2010/0274885 A1 | 10/2010 | Yoo et al. |
| 2010/0322250 A1 | 12/2010 | Shetty et al. |
| 2010/0325264 A1 | 12/2010 | Crowder et al. |
| 2010/0325277 A1 | 12/2010 | Muthiah et al. |
| 2011/0038377 A1 | 2/2011 | Haddad |
| 2011/0040889 A1 | 2/2011 | Garrett et al. |
| 2011/0047620 A1 | 2/2011 | Mahaffey et al. |
| 2011/0055921 A1 | 3/2011 | Narayanaswamy et al. |
| 2011/0066718 A1 | 3/2011 | Susai et al. |
| 2011/0066736 A1 | 3/2011 | Mitchell et al. |
| 2011/0087696 A1 | 4/2011 | Lacapra |
| 2011/0153822 A1 | 6/2011 | Rajan et al. |
| 2011/0154132 A1 | 6/2011 | Aybay |
| 2011/0154443 A1 | 6/2011 | Thakur et al. |
| 2011/0173295 A1 | 7/2011 | Bakke et al. |
| 2011/0184733 A1 | 7/2011 | Yu et al. |
| 2011/0208714 A1 | 8/2011 | Soukal et al. |
| 2011/0211553 A1 | 9/2011 | Haddad |
| 2011/0246800 A1 | 10/2011 | Accpadi et al. |
| 2011/0273984 A1 | 11/2011 | Hsu et al. |
| 2011/0282997 A1 | 11/2011 | Prince et al. |
| 2011/0283018 A1 | 11/2011 | Levine et al. |
| 2011/0292857 A1 | 12/2011 | Sarikaya et al. |
| 2011/0295924 A1 | 12/2011 | Morris |
| 2011/0307629 A1 | 12/2011 | Haddad |
| 2011/0321122 A1 | 12/2011 | Mwangi et al. |
| 2012/0005372 A1 | 1/2012 | Sarikaya et al. |
| 2012/0016994 A1 | 1/2012 | Nakamura et al. |
| 2012/0039341 A1 | 2/2012 | Latif et al. |
| 2012/0041965 A1 | 2/2012 | Vasquez et al. |
| 2012/0047571 A1 | 2/2012 | Duncan et al. |
| 2012/0054497 A1 | 3/2012 | Korhonen |
| 2012/0059934 A1 | 3/2012 | Rafiq et al. |
| 2012/0063314 A1 | 3/2012 | Pignataro et al. |
| 2012/0066489 A1 | 3/2012 | Ozaki et al. |
| 2012/0071131 A1 | 3/2012 | Zisapel et al. |
| 2012/0101952 A1 | 4/2012 | Raleigh et al. |
| 2012/0110210 A1 | 5/2012 | Huang et al. |
| 2012/0117379 A1 | 5/2012 | Thornewell et al. |
| 2012/0173873 A1* | 7/2012 | Bell .................. G06F 21/572 |
| | | 713/156 |
| 2012/0174217 A1 | 7/2012 | Ormazabal |
| 2012/0191847 A1 | 7/2012 | Nas et al. |
| 2012/0215704 A1 | 8/2012 | Simpson et al. |
| 2012/0259998 A1 | 10/2012 | Kaufman |
| 2012/0284296 A1 | 11/2012 | Arifuddin et al. |
| 2012/0311153 A1 | 12/2012 | Morgan |
| 2012/0317266 A1 | 12/2012 | Abbott |
| 2013/0007870 A1 | 1/2013 | Devarajan et al. |

(56) References Cited

U.S. PATENT DOCUMENTS

| | | |
|---|---|---|
| 2013/0029726 A1 | 1/2013 | Berionne et al. |
| 2013/0091002 A1 | 4/2013 | Christie et al. |
| 2013/0100815 A1 | 4/2013 | Kakadia et al. |
| 2013/0103805 A1 | 4/2013 | Lyon |
| 2013/0104230 A1 | 4/2013 | Tang et al. |
| 2013/0110939 A1 | 5/2013 | Yang et al. |
| 2013/0120168 A1 | 5/2013 | Kumar et al. |
| 2013/0151725 A1 | 6/2013 | Baginski et al. |
| 2013/0166715 A1 | 6/2013 | Yuan et al. |
| 2013/0198322 A1 | 8/2013 | Oran et al. |
| 2013/0201999 A1 | 8/2013 | Savolainen et al. |
| 2013/0205035 A1 | 8/2013 | Chen |
| 2013/0205040 A1 | 8/2013 | Naor et al. |
| 2013/0263259 A1 | 10/2013 | Huston, III et al. |
| 2013/0335010 A1 | 12/2013 | Wu et al. |
| 2013/0336122 A1 | 12/2013 | Barush et al. |
| 2013/0340079 A1 | 12/2013 | Gottlieb |
| 2014/0025823 A1 | 1/2014 | Szabo et al. |
| 2014/0040478 A1 | 2/2014 | Hsu et al. |
| 2014/0095661 A1 | 4/2014 | Knowles et al. |
| 2014/0269484 A1 | 9/2014 | Dankberg et al. |
| 2014/0317404 A1 | 10/2014 | Carlson et al. |
| 2015/0089215 A1* | 3/2015 | Hattori ............... H04L 9/3263 713/156 |
| 2016/0112406 A1* | 4/2016 | Bugrov ............ H04L 63/0823 726/10 |
| 2017/0041151 A1* | 2/2017 | Kommireddy ........ H04L 9/3228 |

FOREIGN PATENT DOCUMENTS

| | | |
|---|---|---|
| CA | 2512312 A1 | 7/2004 |
| EP | 0 605 088 | 7/1994 |
| EP | 0 738 970 | 10/1996 |
| EP | 0744850 A2 | 11/1996 |
| EP | 1 081 918 | 3/2001 |
| EP | 2 244 418 | 10/2010 |
| GB | 2 448 071 | 10/2008 |
| JP | 63010250 A | 1/1988 |
| JP | 06-205006 | 7/1994 |
| JP | 06-332782 | 12/1994 |
| JP | 8021924 | 3/1996 |
| JP | 08-328760 | 12/1996 |
| JP | 08-339355 | 12/1996 |
| JP | 9016510 A | 1/1997 |
| JP | 11282741 A | 10/1999 |
| JP | 2000183935 | 6/2000 |
| JP | 2005-010913 | 1/2005 |
| JP | 2008-257738 A | 10/2008 |
| JP | 2009-124113 | 6/2009 |
| JP | 2011-188071 | 9/2011 |
| JP | 2011-238263 | 11/2011 |
| NZ | 566291 | 12/2008 |
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |
| WO | WO 00/58870 | 10/2000 |
| WO | WO 02/39696 | 5/2002 |
| WO | WO 02/056181 A2 | 7/2002 |
| WO | WO 2004/061605 A2 | 7/2004 |
| WO | WO 2006/091040 | 8/2006 |
| WO | WO 2009/052668 | 10/2007 |
| WO | WO 2008/130983 | 10/2008 |
| WO | WO 2008/147973 A2 | 12/2008 |

OTHER PUBLICATIONS

Who is Xelerance,<http://www.xelerance.com>, slides 1-6 (2007).

"A Process for Selective Routing of Servlet Content to Transcoding Modules," Research Disclosure 422124, Jun. 1999, pp. 889-890, IBM Corporation.

"A Storage Architecture Guide," Second Edition, 2001, Auspex Systems, Inc., www.auspex.com, last accessed on Dec. 30, 2002.

"BIG-IP® Global Traffic Manager," <http://www.f5.com/products/big-ip/product-modules/global-traffic-manager.html>, last accessed Jul. 6, 2010, 2 pages.

"BIG-IP® Global Traffic Manager™ and BIG-IP Link Controller™ : Implementations," Manual 0304-00, Dec. 3, 2009, pp. 1-161, version 10.1, F5 Networks, Inc.

"BIG-IP® Systems: Getting Started Guide," Manual 0300-00, Feb. 4, 2010, pp. 1-102, version 10.1, F5 Networks, Inc.

"CSA Persistent File System Technology," A White Paper, Jan. 1, 1999, p. 1-3, http://www.cosoa.com/white_papers/pfs.php, Colorado Software Architecture, Inc.

"Detail Requirement Report: RQ-GTM-0000024," <http://fpweb/fptopic.asp?REQ=RQ-GTM-0000024>, F5 Networks, Inc., 1999, printed Mar. 31, 2010, 2 pages.

"Detail Requirement Report: RQ-GTM-0000028," <http://fpweb/fptopic.asp?REQ=RQ-GTM-0000028>, F5 Networks, Inc., 1999, printed Mar. 31, 2010, 2 pages.

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

"Distributed File System: A Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.

"DNS DDOS Protection Functional Spec," BigipDNSDDOSProtectionFS<TMO<TWiki, last accessed Mar. 31, 2010, 2 pages.

"DNS Security (DNSSEC) Solutions," <http://www.f5.com/solutions/security/dnssec>, F5 Networks, Inc., printed Aug. 23, 2010, pp. 1-4.

"DNSSEC Functional Spec," TMOSDnsSECFS<TMOS<TWiki, last accessed on Mar. 31, 2010, pp. 1-10.

"DNSX; DNSX Secure Signer; DNSSEC Management Solution," <http://www.xelerance.com/dnssec>.pp. 1-9, Aug. 2009.

"F5 and Infoblox Provide Customers with Complete DNS Security Solution," <http://www.f5.com/news-press-events/press/2010/20100301.html>, Mar. 1, 2010, 2 pages, F5 Networks, Inc., Seattle and Santa Clara, California.

"F5 Solutions Enable Government Organizations to Meet 2009 DNSSEC Compliance," .<http://www.f5.com/news-press-events/press/2009/20091207.html>, Dec. 7, 2009, 2 pages, F5 Networks, Inc., Seattle, California.

"Market Research & Releases, CMPP PoC documentation", last accessed Mar. 29, 2010, (http://mainstreet/sites/PD/Teams/ProdMgmt/MarketResearch/Universal).

"Market Research & Releases, Solstice Diameter Requirements", last accessed Mar. 29, 2010, (http.//mainstreet/sites/PD/Teams/ProdMgmt/MarketResearch/Unisversal).

"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.

"PDR/CDR for RQ-GTM-0000028," BigipDNSDDOSProtectionPDR<TMOS<TWiki, last accessed on Mar. 31, 2010, pp. 1-14.

"Respond to Server Depending on TCP::Client_Port", DevCentral Forums iRules, pp. 1-6, last accessed Mar. 26, 2010, (http://devcentral.f5.com/Default/aspx?tabid=53&forumid=5&tpage=1&v).

"Scaling Next Generation Web Infrastructure with Content-Intelligent Switching: White Paper," Apr. 2000, p. 1-9 Alteon Web Systems, Inc.

(56) References Cited

OTHER PUBLICATIONS

"Secure64 DNS Signer", <http://www.secure64.com>, Data sheet, Jun. 22, 2011, V.3.1., 2 pages.
"Servlet/Applet/HTML Authentication Process With Single Sign-On," Research Disclosure 429128, Jan. 2000, pp. 163-164, IBM Corporation.
"The AFS File System in Distributed Computing Environment," www.transarc.ibm.com/Library/whitepapers/AFS/afsoverview.html, last accessed on Dec. 20, 2002.
"Traffic Surges; Surge Queue; Netscaler Defense," 2005, PowerPoint Presentation, slides 1-12, Citrix Systems, Inc.
"UDDI Overview", Sep. 6, 2000, pp. 1-21, uddi.org, (http://www.uddi.org/).
"UDDI Technical White Paper," Sep. 6, 2000, pp. 1-12, uddi-org, (http://www.uddi.org/).
"UDDI Version 3.0.1", UDDI Spec Technical Committee Specification, Oct. 14, 2003, pp. 1-383, uddi.org, (http://www.uddi.org/).
"VERITAS SANPoint Foundation Suite(tm) and SANPoint Foundation Suite(tm) HA: New VERITAS Volume Management and File System Technology for Cluster Environments," Sep. 2001, VERITAS Software Corp.
"Who is Xelerance," <http://www.xelerance.com>, slides 1-6.
"Windows Clustering Technologies—An Overview," Nov. 2001, Microsoft Corp., www.microsoft.com, last accessed on Dec. 30, 2002.
"Windows Server 2003 Kerberos Extensions," Microsoft TechNet, 2003 (Updated Jul. 31, 2004), http://technet.microsoft.com/en-us/library/cc738207, Microsoft Corporation.
Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.
Aguilera, Marcos K. et al., "Improving recoverability in multi-tier storage systems," International Conference on Dependable Systems and Networks (DSN-2007), Jun. 2007, 10 pages, Edinburgh, Scotland.
Anderson et al., "Serverless Network File System," in the 15th Symposium on Operating Systems Principles, Dec. 1995, Association for Computing Machinery, Inc. (18 pages).
Anderson, Darrell C. et al., "Interposed Request Routing for Scalable Network Storage," ACM Transactions on Computer Systems 20(1): (Feb. 2002), pp. 1-24.
Anonymous, "How DFS Works: Remote File Systems," Distributed File System (DFS) Technical Reference, retrieved from the Internet on Feb. 13, 2009: URL<:http://technetmicrosoft.com/en-us/library/cc782417WS.10,printer).aspx> (Mar. 2003).
Apple, Inc., "Mac OS X Tiger Keynote Intro. Part 2," Jun. 2004, www.youtube.com <http://www.youtube.com/watch?v=zSBJwEmRJbY>, p. 1.
Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-6.
Arends et al., "DNS Security Introduction and Requirements", Network Working Group, RFC 4033, Mar. 2005, pp. 1-20.
Arends et al., "Protocol Modifications for the DNS Security Extensions," Network Working Group, RFC 4035, Mar. 1, 2005, 54 pages, The Internet Society.
Arends et al., "Resource Records for the DNS Security Extensions", Network Working Group, RFC 4034, Mar. 2005, pp. 1-28.
Aura T., "Cryptographically Generated Addresses (CGA)", Network Working Group, RFC 3972, Mar. 2005, pp. 1-21.
Baer, T., et al., "The Elements of Web Services" ADTmag.com, Dec. 1, 2002, pp. 1-6, (http://www.adtmag.com).
Bagnulo et al., "DNS 64: DNS extensions for Network Address Translation from IPv6 Clients to IPv4 Servers," Internet draft, Jul. 2010, pp. 1-31, IETF Trust.
Basney et al., "Credential Wallets: A Classification of Credential Repositories Highlighting MyProxy," Sep. 19-21, 2003, pp. 1-20, 31st Research Conference on Communication, Information and Internet Policy (TPRC 2003), Arlington, Virginia.
Bau et al., "A Security Evaluation of DNSSEC with NSEC3," Mar. 2, 2010; updated version corrects and supersedes a paper in the NDSS' 10 proceedings, pp. 1-18.
Blue Coat, "Technology Primer: CIFS Protocol Optimization," Blue Coat Systems Inc., 2007, pp. 1-3, (http://www.bluecoat.com).
Botzum, Keys, "Single Sign On—A Contrarian View," Aug. 6, 2001, pp. 1-8, Open Group Website, http://www.opengroup.org/security/topics.htm.
Cabrera et al., "Swift: A Storage Architecture for Large Objects," In Proceedings of the-Eleventh IEEE Symposium on Mass Storage Systems, Oct. 1991, pp. 123-128.
Cabrera et al., "Swift: Using Distributed Disk Striping to Provide High I/O Data Rates," Fall 1991, pp. 405-436, vol. 4, No. 4, Computing Systems.
Cabrera et al., "Using Data Striping in a Local Area Network," 1992, technical report No. UCSC-CRL-92-09 of the Computer & Information Sciences Department of University of California at Santa Cruz.
Callaghan et al., "NFS Version 3 Protocol Specifications" (RFC 1813), Jun. 1995, The Internet Engineering Task Force (IETN), www.ietf.org, last accessed on Dec. 30, 2002.
Carns et al., "PVFS: A Parallel File System for Linux Clusters," in Proceedings of the Extreme Linux Track: 4th Annual Linux Showcase and Conference, Oct. 2000, pp. 317-327, Atlanta, Georgia, USENIX Association.
Carpenter, B., "Transmission of IPv6 over IPv4 Domains without Explicit Tunnels", Network Working Group, RFC 2529, Mar. 1999, pp. 1-10.
Cavale, M. R., "Introducing Microsoft Cluster Service (MSCS) in the Windows Server 2003", Microsoft Corporation, Nov. 2002.
Crescendo Networks, "Application Layer Processing (ALP)," 2003-2009, pp. 168-186, Chapter 9, CN-5000E/5500E, Foxit Software Company.
Dan Kaminsky, (slideshow presentation) "Black Ops of Fundamental Defense: Introducing the Domain Key Infrastructure", retrieved from Internet URL: http://www.slideshare.net/RecursionVentures/dki-2, (slides 1-116) (Aug. 2010).
Eastlake D., "Domain Name System Security Extensions", Network Working Group, RFC 2535, Mar. 1999, pp. 1-44.
English Translation of Notification of Reason(s) for Refusal for JP 2002-556371 (Dispatch Date: Jan. 22, 2007).
F5 Networks Inc., "3-DNS® Reference Guide, version 4.5", F5 Networks Inc., Sep. 2002, pp. 2-1-2-28, 3-1-3-12, 5-1-5-24, Seattle, Washington.
F5 Networks Inc., "Big-IP® Reference Guide, version 4.5", F5 Networks Inc., Sep. 2002, pp. 11-1-11-32, Seattle, Washington.
F5 Networks Inc., "Case Information Log for 'Issues with BoNY upgrade to 4.3'", as early as Feb. 2008.
F5 Networks Inc., "Configuration Guide for Local Traffic Management", F5 Networks Inc., Jan. 2006, version 9.2.2, 406 pgs.
F5 Networks Inc., "Deploying the BIG-IP LTM for Diameter Traffic Management" F5® Deployment Guide, Publication date Sep. 2010, Version 1.2, pp. 1-19.
F5 Networks Inc., "F5 Diameter RM", Powerpoint document, Jul. 16, 2009, pp. 1-7.
F5 Networks Inc., "F5 WANJet CIFS Acceleration", White Paper, F5 Networks Inc., Mar. 2006, pp. 1-5, Seattle, Washington.
F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).
F5 Networks Inc., "Using F5's 3-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).
F5 Networks, Inc., "BIG-IP ASM 11.2.0", Release Notes, Sep. 19, 2012, Version 11.2.0, F5 Networks, Inc.
F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.

(56) References Cited

OTHER PUBLICATIONS

F5 Networks, Inc., "BIG-IP Systems: Getting Started Guide," Manual 0300-00, Feb. 4, 2010, pp. 1-102, version 10.1, F5 Networks, Inc.

F5 Networks, Inc., "BIG-IP® Access Policy Manager®: Application Access," version 12.1, published May 9, 2016 (66 pages).

F5 Networks, Inc., "BIG-IP® Access Policy Manager®: Authentication and Single Sign-On," version 12.1, published May 9, 2016 (332 pages).

F5 Networks, Inc., "BIG-IP® Access Policy Manager®: Implementations," version 12.1, published May 9, 2016 (168 pages).

F5 Networks, Inc., "BIG-IP® Access Policy Manager®: Network Access," version 12.1, published May 9, 2016 (108 pages).

F5 Networks, Inc., "BIG-IP® Access Policy Manager®: Portal Access," version 12.1, published May 9, 2016 (82 pages).

F5 Networks, Inc., "BIG-IP® Access Policy Manager®: Secure Web Gateway", version 12.1, published May 9, 2016 (180 pages).

F5 Networks, Inc., "BIG-IP® Application Security Manager™ : Getting Started Guide", Version 11.2, May 7, 2012, F5 Networks, Inc.

F5 Networks, Inc., "BIG-IP® Application Security Manager™ : Implementations", Version 11.2, May 7, 2012, F5 Networks, Inc.

F5 Networks, Inc., "BIG-IP® TMOS® : Implementations", Manual, May 5, 2015, Version 11.2, F5 Networks, Inc.

F5 Networks, Inc., "Configuration Guide for BIG-IP® Application Security Manager™ ", Manual, May 7, 2012, Version 11.2, F5 Networks, Inc.

F5 Networks, Inc., "F5 TMOS Operations Guide", Manual, Mar. 5, 2015, F5 Networks, Inc.

F5 Networks, Inc., "Release Note: BIG-IP APM 12.1.0," published Jun. 6, 2016 (13 pages).

Fajardo V., "Open Diameter Software Architecture," Jun. 25, 2004, pp. 1-6, Version 1.0.7.

Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.

Farley, M., "Building Storage Networks," Jan. 2000, McGraw Hill, ISBN 0072120509.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Forrester Research, Inc., "DNSSEC Ready for Prime Time", Forrester Research, Inc. Cambridge, MA, 23 pages (Jul. 2010).

Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.

Gibson et al., "NASD Scalable Storage Systems," Jun. 1999, USENIX99, Extreme Linux Workshop, Monterey, California.

Gupta et al., "Algorithms for Packet Classification", Computer Systems Laboratory, Stanford University, CA, Mar./Apr. 2001, pp. 1-29.

Hagino J., et al., "An IPv6-to-IPv4 Transport Relay Translator", Network Working Group, RFC 3142, Jun. 2001, pp. 1-11.

Harrison, C., May 19, 2008 response to Communication pursuant to Article 96(2) EPC dated Nov. 9, 2007 in corresponding European patent application No. 02718824.2.

Hartman, J., "The Zebra Striped Network File System," 1994, Ph.D. dissertation submitted in the Graduate Division of the University of California at Berkeley.

Haskin et al., "The Tiger Shark File System," 1996, in proceedings of IEEE, Spring COMPCON, Santa Clara, CA, www.research.ibm.com, last accessed on Dec. 30, 2002.

Heinz G., "Priorities in Stream Transmission Control Protocol (SCTP) Multistreaming", Thesis submitted to the Faculty of the University of Delaware, Spring 2003, pp. 1-35.

Higgins, Kelly Jackson, "Internet Infrastructure Reaches Long-Awaited Security Milestone," Tech Center: Security Services, <http//www.darkreading.com/securityservices/security/management/showArticle.jhtml?article>, Jul. 28, 2010. pp. 1-4.

Hochmuth, Phil, "F5, CacheFlow pump up content-delivery lines," Network World Fusion, May 4, 2001, 1 page, Las Vegas, Nevada.

Howarth, Fran, "Investing in security versus facing the consequences," White Paper by Bloor Research, Sep. 2010, pp. 1-15.

Hu, J., Final Office action dated Sep. 21, 2007 for related U.S. Appl. No. 10/336,784.

Hu, J., Office action dated Feb. 6, 2007 for related U.S. Appl. No. 10/336,784.

Hwang et al., "Designing SSI Clusters with Hierarchical Checkpointing and Single 1/0 Space," IEEE Concurrency, Jan.-Mar. 1999, pp. 60-69.

Ilvesmaki M., et al., "On the Capabilities of Application Level Traffic Measurements to Differentiate and Classify Internet Traffic", Presented in SPIE's International Symposium ITcom, Aug. 19-21, 2001, pp. 1-11, Denver, Colorado.

International Search Report and Written Opinion for International Patent Application No. PCT/US2011/058469 (dated May 30, 2012).

International Search Report and Written Opinion for PCT/US2011/054331, dated Mar. 13, 2012, 13 pages.

International Search Report for International Patent Application No. PCT/US2008/083117 (dated Jun. 23, 2009).

International Search Report for International Patent Application No. PCT/US2008/060449 (dated Apr. 9, 2008).

International Search Report for International Patent Application No. PCT/US2008/064677 (dated Sep. 6, 2009).

International Search Report for International Patent Application No. PCT/US02/00720, dated Mar. 19, 2003.

International Search Report for International Patent Application No. PCT/US2012/071648 (dated May 27, 2013).

International Search Report from International Application No. PCT/US03/41202, dated Sep. 15, 2005.

Internet Protocol,"DARPA Internet Program Protocol Specification", (RFC:791), Information Sciences Institute, University of Southern California, Sep. 1981, pp. 1-49.

Karamanolis et al., "An Architecture for Scalable and Manageable File Services," HPL-2001-173, Jul. 26, 2001. p. 1-14.

Katsurashima et al., "NAS Switch: A Novel CIFS Server Virtualization, Proceedings," 20th IEEE/11th NASA Goddard Conference on Mass Storage Systems and Technologies, 2003 (MSST 2003), Apr. 2003.

Kawamoto, D., "Amazon Files for Web Services Patent", CNET News.com, Jul. 28, 2005, pp. 1-2, last accessed May 4, 2006, (http://news.com).

Kimball, C.E. et al., "Automated Client-Side Integration of Distributed Application Servers," 13Th LISA Conf., 1999, pp. 275-282 of the Proceedings.

Klayman, J., response filed by Japanese associate to office action dated Jan. 22, 2007 in corresponding Japanese patent application No. 2002-556371.

Klayman, J., Nov. 13, 2008 e-mail to Japanese associate including instructions for response to office action dated May 26, 2008 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Kohl et al., "The Kerberos Network Authentication Service (V5)," RFC 1510, Sep. 1993. (http://www.ietf.org/ rfc/rfc1510.txt?number=1510).

Korkuzas, V., Communication pursuant to Article 96(2) EPC dated Sep. 11, 2007 in corresponding European patent application No. 02718824.2-2201.

LaMonica M., "Infravio Spiffs Up Web Services Registry Idea", CNET News.com, May 11, 2004, pp. 1-2, last accessed Sep. 20, 2004, (http://www.news.com).

Laurie et al., "DNS Security (DNSSEC) Hashed Authenticated Denial of Existence," Mar. 2008, pp. 1-52, The IETF Trust.

(56) References Cited

OTHER PUBLICATIONS

Laurie et al., "DNS Security (DNSSEC) Hashed Authenticated Denial of Existence," Network Working Group, RFC 5155, Feb. 2008, pp. 1-51.
Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.
Long et al., "Swift/RAID: A distributed RAID System", Computing Systems, Summer 1994, vol. 7, pp. 333-359.
Mac Vittie, L., "Message-Based Load Balancing: Using F5 Solutions to Address the Challenges of Scaling Diameter, RADIUS, and Message-Oriented Protocols", F5 Technical Brief, 2005, pp. 1-9, F5 Networks Inc., Seattle, Washington.
Macvittie, Lori, "It's DNSSEC Not DNSSUX," DevCentral>Weblogs, <http://devcentral.f5.com/weblogs/macvittie/archive/2009/11/18/itrsquos-dnssec-not-dnssux.aspx>, posted on Nov. 18, 2009, accessed on Jul. 6, 2010, pp. 3-7.
Macvittie, Lori, "Message-Based Load Balancing," Technical Brief, Jan. 2010, pp. 1-9, F5 Networks, Inc.
Meyer et al., "F5 and Infoblox DNS Integrated Architecture: Offering a Complete Scalable, Secure DNS Solution," F5 Technical Brief, Feb. 2, 2010, 18 pages, URL: http://web.archive.prg/web/20100326145019/http://www.f5.com/pdf/white-papers/infoblox-wp.pdf.
Modiano E., "Scheduling Algorithms for Message Transmission Over a Satellite Broadcast System", MIT Lincoln Laboratory Advanced Network Group, Nov. 1997, pp. 1-7.
Nichols K., et al., "Definition of the Differentiated Services Field (DS Field) in the IPv4 and IPv6 Headers", (RFC:2474) Network Working Group, Dec. 1998, pp. 1-19, last accessed Oct. 8, 2012, (http://www.ietf.org/rfc/rfc2474.txt).
Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.
Norton et al., "CIFS Protocol Version CIFS-Spec 0.9," 2001, Storage Networking Industry Association (SNIA), www.snia.org, last accessed on Mar. 26, 2001.
Notice of Reasons for Rejection and Its English Translation for corresponding Japanese Patent Application No. 2014-550426 (dated Apr. 13, 2016) (3 pages).
Novotny et al., "An Online Credential Repository for the Grid: MyProxy," 2001, pp. 1-8.
Office Action for corresponding Chinese Application No. 201280070784.4 (dated Dec. 6, 2016) (15 pages).
Office Action for corresponding Taiwan Patent Application No. 101145417 (dated May 11, 2016) (11 pages).
Ott D., et al., "A Mechanism for TCP-Friendly Transport-level Protocol Coordination", USENIX Annual Technical Conference, 2002, University of North Carolina at Chapel Hill, pp. 1-12.
Owasp, "Testing for Cross site scripting", OWASP Testing Guide v2, Table of Contents, Feb. 24, 2011, pp. 1-5, (www.owasp.org/index.php/Testing_for_Cross_site_scripting).
Padmanabhan V., et al., "Using Predictive Prefetching to Improve World Wide Web Latency", SIGCOM, 1996, pp. 1-15.
Pashalidis et al., "A Taxonomy of Single Sign-On Systems," 2003, pp. 1-16, Royal Holloway, University of London, Egham Surrey, TW20, 0EX, United Kingdom.
Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004.Royal Holloway, University of London.
Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.
Pearson, P.K., "Fast Hashing of Variable-Length Text Strings," Comm. of the ACM, Jun. 1990, pp. 1-4, vol. 33, No. 6.
Peterson, M., "Introducing Storage Area Networks," Feb. 1998, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.
Response filed Jul. 6, 2007 to Office action dated Feb. 6, 2007 for related patent U.S. Appl. No. 10/336,784.
Response filed Mar. 20, 2008 to Final Office action dated Sep. 21, 2007 for U.S. Appl. No. 10/336,784.
Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000 (Mar. 26, 2000), pp. 864-873, XP010376176 ISBN: 0-7803-5880-5 p. 867, col. 2, last paragraph-p. 868, col. 1, paragraph 1.
Rosen E., et al., "MPLS Label Stack Encoding", (RFC:3032) Network Working Group, Jan. 2001, pp. 1-22, last accessed Oct. 8, 2012, (http://www.ietf.org/rfc/rfc3032.txt).
RSYNC, "Welcome to the RSYNC Web Pages," Retrieved from the Internet URL: http://samba.anu.edu.ut.rsync/. (Retrieved on Dec. 18, 2009).
Savage, et al., "AFRAID—A Frequently Redundant Array of Independent Disks," Jan. 22-26, 1996, pp. 1-13, USENIX Technical Conference, San Diego, California.
Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.
Schilit B., "Bootstrapping Location-Enhanced Web Services", University of Washington, Dec. 4, 2003, (http://www.cs.washington.edu/news/colloq.info.html).
Seeley R., "Can Infravio Technology Revive UDDI?", ADTmag.com, Oct. 22, 2003, last accessed Sep. 30, 2004, (http://www.adtmag.com).
Shohoud, Y., "Building XML Web Services with VB .NET and VB 6", Addison Wesley, 2002, pp. 1-14.
Silva, Peter, "DNSSEC: The Antidote to DNS Cache Poisoning and Other DNS Attacks," F5 Technical Brief, 2009, pp. 1-10.
Sleeper B., "The Evolution of UDDI" UDDI.org White Paper, The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.
Soltis et al., "The Global File System," Sep. 17-19, 1996, in Proceedings of the Fifth NASA Goddard Space Flight Center Conference on Mass Storage Systems and Technologies, College Park, Maryland.
Sommers F., "Whats New in UDDI 3.0—Part 1", Web Services Papers, Jan. 27, 2003, pp. 1-4, last accessed Mar. 31, 2004, http://www.webservices.org/index.php/article/articleprint/871/-1/24/).
Sommers F., "Whats New in UDDI 3.0—Part 2", Web Services Papers, Mar. 2, 2003, pp. 1-8, last accessed Nov. 1, 2007, (http://www.web.archive.org/web/20040620131006/).
Sommers F., "Whats New in UDDI 3.0—Part 3", Web Services Papers, Sep. 2, 2003, pp. 1-4, last accessed Mar. 31, 2007, (http://www.webservices.org/index.php/article/articleprint/894/-1/24/).
Sorenson, K.M., "Installation and Administration: Kimberlite Cluster Version 1.1.0, Rev. Dec. 2000," Mission Critical Linux, http://oss.missioncriticallinux.corn/kimberlite/kimberlite.pdf.
Stakutis, C., "Benefits of SAN-based file system sharing," Jul. 2000, pp. 1-4, InfoStor, www.infostor.com, last accessed on Dec. 30, 2002.

(56) References Cited

OTHER PUBLICATIONS

Tatipamula et al., "IPv6 Integration and Coexistence Strategies for Next-Generation Networks", IEEE Communications Magazine, Jan. 2004, pp. 88-96.

Thekkath et al., "Frangipani: A Scalable Distributed File System," in Proceedings of the 16th ACM Symposium on Operating Systems Principles, Oct. 1997, pp. 1-14, Association for Computing Machinery, Inc.

Thomson et al., "DNS Extensions to Support IP Version 6," The Internet Society, Network Working Group, RFC 3596, Oct. 2003, pp. 1-8.

Tulloch, Mitch, "Microsoft Encyclopedia of Security," 2003, pp. 218, 300-301, Microsoft Press, Redmond, Washington.

Uesugi, H., Nov. 26, 2008 amendment filed by Japanese associate in response to office action dated May 26, 2008 in corresponding Japanese patent application No. 2002-556371.

Uesugi, H., English translation of office action dated May 26, 2008 in corresponding Japanese patent application No. 2002-556371.

Uesugi, H., Jul. 15, 2008 letter from Japanese associate reporting office action dated May 26, 2008 in corresponding Japanese patent application No. 2002-556371.

Wallace, "Delegating Identity Using X.509 Certificates", IETF Trust, Jul. 29, 2015, 8 pgs.

Wang B., "Priority and Realtime Data Transfer Over the Best-Effort Internet", Dissertation Abstract, 2005, ScholarWorks@UMASS.

Weiler et al., "Minimally Covering NSEC Records and DNSSEC On-line Signing," Network Working Group, RFC 4470, Apr. 2006, 8 pages, The Internet Society.

Wikipedia, "Diameter (protocol)", pp. 1-11, last accessed Oct. 27, 2010, (http://en.wikipedia.org/wiki/Diameter_(protocol)).

Wikipedia, "Domain Name System Security Extensions," <http://en.wikipedia.org/wiki/DNSSEC>, accessed Jun. 3, 2010, pp. 1-20.

Wikipedia, "IPv6", <http://en.wikipedia.org/wiki/IPv6>, accessed Jun. 3, 2010, 20 pages.

Wikipedia, "List of DNS record types," <http://en.wikipedia.org/wiki/List_of_DNS_record_types>, Jun. 2010, pp. 1-6.

Wilkes, J., et al., "The HP AutoRAID Hierarchical Storage System," Feb. 1996, vol. 14, No. 1, ACM Transactions on Computer Systems.

Williams et al., "Forwarding Authentication," The Ultimate Windows Server 2003 System Administrator's Guide, 2003, 2 pages, Figure 10.7, Addison-Wesley Professional, Boston, Massachusetts.

Woo T.Y.C., "A Modular Approach to Packet Classification: Algorithms and Results", Bell Laboratories, Lucent Technologies, Mar. 2000, pp. 1-10.

Xelerance, "DNSX; DNSX Secure Signer; DNSSEC Management Solution," <http://www.xelerance.com/dnssec>.pp. 1-9, Aug. 2009.

Zayas, E., "AFS-3 Programmer's Reference: Architectural Overview," Transarc Corp., version 1.0 of Sep. 2, 1991, doc. No. FS-00-D160.

* cited by examiner

METHODS FOR SECURED SCEP ENROLLMENT FOR CLIENT DEVICES AND DEVICES THEREOF

This application claims the benefit of U.S. Provisional Patent Application Ser. No. 62/281,166, filed Jan. 20, 2016 which is hereby incorporated by reference in its entirety.

FIELD

This technology generally relates to methods and devices for network traffic management and, more particularly, to methods for secured SCEP enrollment for client devices and devices thereof.

BACKGROUND

The Simple Certificate Enrollment Protocol (SCEP) allows network administrators to easily enroll network computing devices for certificates. SCEP allows for two different authorization mechanisms prior to obtaining the certificates. The first authorization mechanism is manual, where the requester is required to wait after submission for the Certification Authority (CA) administrator or certificate officer to approve the request. The second authorization method is pre-shared secret, where the SCEP server creates a challenge password that must be somehow delivered to the requester included with a submission back to the server.

However, one critical issue in the second authorization method is that it may be possible for a user or computing device to take their legitimately acquired SCEP challenge password and use it to obtain a certificate that represents a different user or computing device with a higher level of access or even to obtain a different type of certificate than what was intended. Additionally, when the challenge passwords are reused, certificates can be easily obtained even without registration of the computing device.

SUMMARY

A method for secured SCEP enrollment of client devices comprising one or more network traffic apparatuses, client devices, or server devices includes receiving a certificate signing request and an encrypted device key from an enrolled mobile device. The received certificate signing request is forwarded to a simple certificate enrollment protocol server upon determining a validity of the received encrypted device key. A signed device certificate is received from the simple certificate enrollment protocol server as a response to the forwarded certificate signing request. The secured simple certificate enrollment protocol enrollment is completed forwarding the signed device certificate to the enrolled mobile device.

A non-transitory computer readable medium having stored thereon instructions for secured SCEP enrollment of client devices comprising machine executable code which when executed by at least one processor, causes the processor to perform steps including receiving a certificate signing request and an encrypted device key from an enrolled mobile device. The received certificate signing request is forwarded to a simple certificate enrollment protocol server upon determining a validity of the received encrypted device key. A signed device certificate is received from the simple certificate enrollment protocol server as a response to the forwarded certificate signing request. The secured simple certificate enrollment protocol enrollment is completed forwarding the signed device certificate to the enrolled mobile device.

A mobile application manager apparatus including one or more processors coupled to a memory and configured to be capable of executing programmed instructions comprising and stored in the memory to receiving a certificate signing request and an encrypted device key from an enrolled mobile device. The received certificate signing request is forwarded to a simple certificate enrollment protocol server upon determining a validity of the received encrypted device key. A signed device certificate is received from the simple certificate enrollment protocol server as a response to the forwarded certificate signing request. The secured simple certificate enrollment protocol enrollment is completed forwarding the signed device certificate to the enrolled mobile device.

This technology provides a number of advantages including providing methods, non-transitory computer readable media and apparatuses that effectively assist with providing secure SCEP enrollment of client devices. The disclosed technology provides secure SCEP enrollment by: first, ensuring that only the enrolled devices can retrieve the certificates by including an obfuscated/encrypted device key as part of the SCEP uniform resource indicator (URI) sent to the client device; second, ensuring that device key is used only once by maintaining a list of keys used to authorize SCEP requests; and lastly, preventing an unauthorized user from retrieving the SCEP certificate for the device by determining whether the device key in the device certificate received from the requesting device is identical to the device key in the list of authorized device keys.

DETAILED DESCRIPTION

Figure 1:
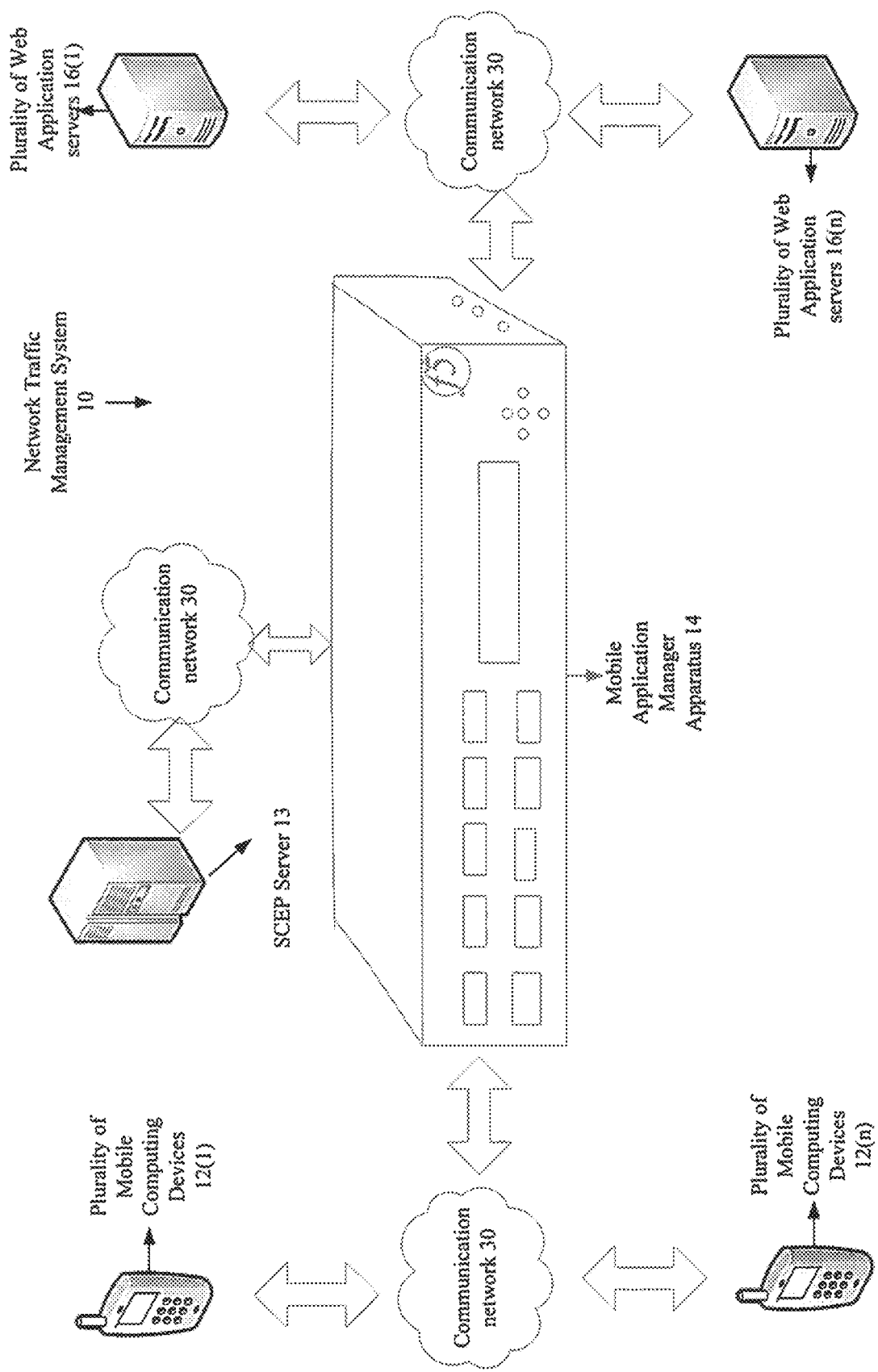
FIG. 1 is an example of a block diagram of an environment including a mobile application manager apparatus for secured SCEP enrollment for client devices.
Figure 2:
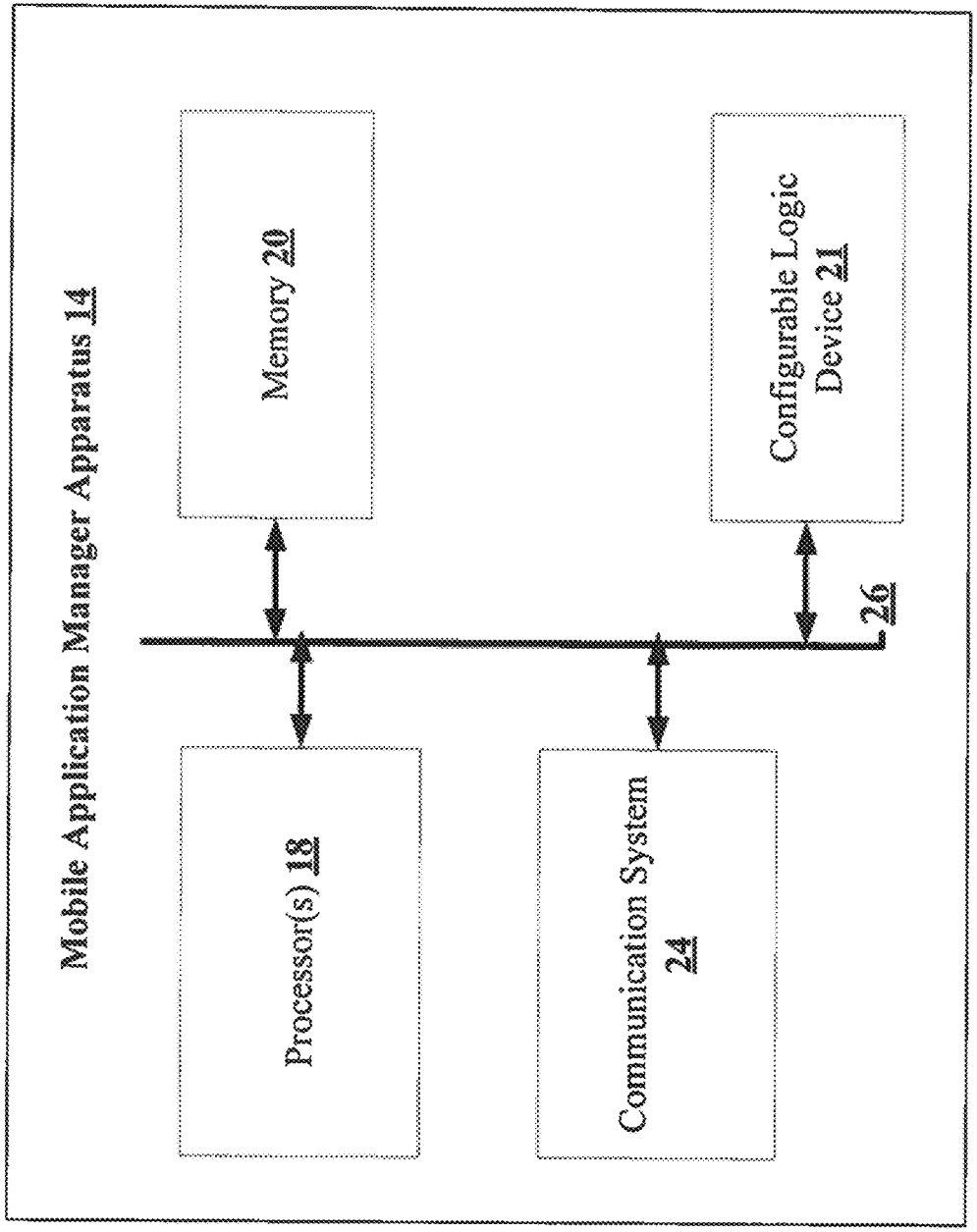
FIG. 2 is an example of a block diagram of the mobile application manager apparatus.

An example of a network environment 10 which incorporates a network traffic management system for secured SCEP enrollment for client devices with the mobile application manager apparatus 14 is illustrated in FIGS. 1 and 2. The exemplary environment 10 includes a plurality of mobile computing devices 12(1)-12(n), a simple certificate enrollment protocol (SCEP) server 13, a mobile application manager apparatus 14, and a plurality of web application servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including providing secured SCEP enrollment for client devices.

Referring more specifically to FIGS. 1 and 2, the mobile application manager apparatus 14 of the network traffic management system is coupled to the plurality of mobile computing devices 12(1)-12(n) through the communication network 30, although the plurality of mobile computing devices 12(1)-12(n) and mobile application manager apparatus 14 may be coupled together via other topologies. Additionally, the mobile application manager apparatus 14 is coupled to the plurality of web application servers 16(1)-16(n) through the communication network 30, although the web application servers 16(1)-16(n) and the mobile application manager apparatus 14 may be coupled together via other topologies. Further, the mobile application manager apparatus 14 is coupled to the SCEP server 13 through the communication network 30, although the SCEP server 13 and mobile application manager apparatus 14 may be coupled together via other topologies The mobile application manager apparatus 14 assists with secured SCEP enrollment for client devices as illustrated and described by way of the examples herein, although the mobile application manager apparatus 14 may perform other types and/or numbers of functions. As illustrated in FIG. 2, the mobile application manager apparatus 14 includes processor or central processing unit (CPU) 18, memory 20, optional configurable hardware logic 21, and a communication system 24 which are coupled together by a bus device 26 although the mobile application manager apparatus 14 may comprise other types and numbers of elements in other configurations. In this example, the bus 26 is a PCI Express bus in this example, although other bus types and links may be used.

The processors 18 within the mobile application manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
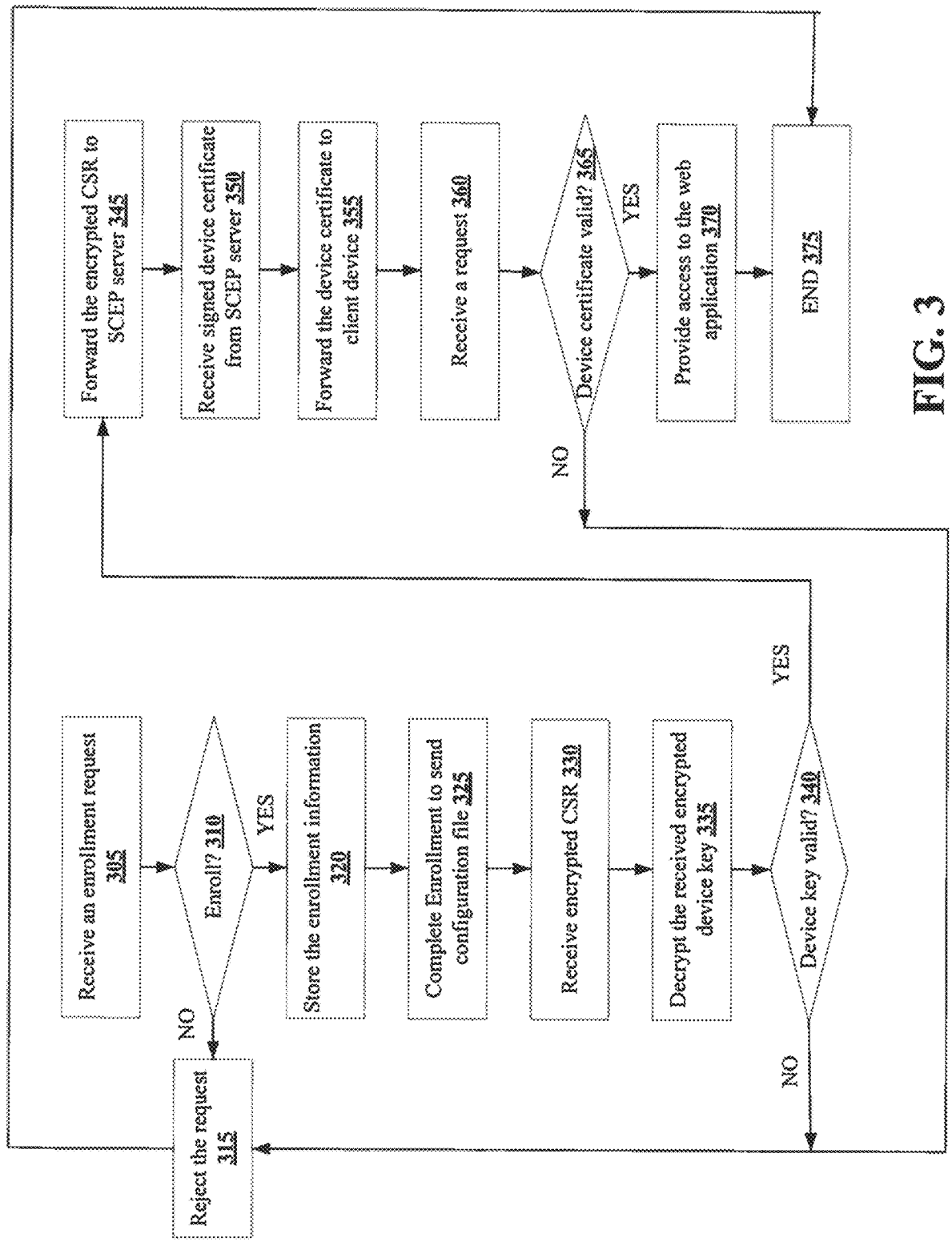
FIG. 3 is an exemplary flowchart of a method for secured SCEP enrollment for client devices.

The memory 20 within the mobile application manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Figure 4:
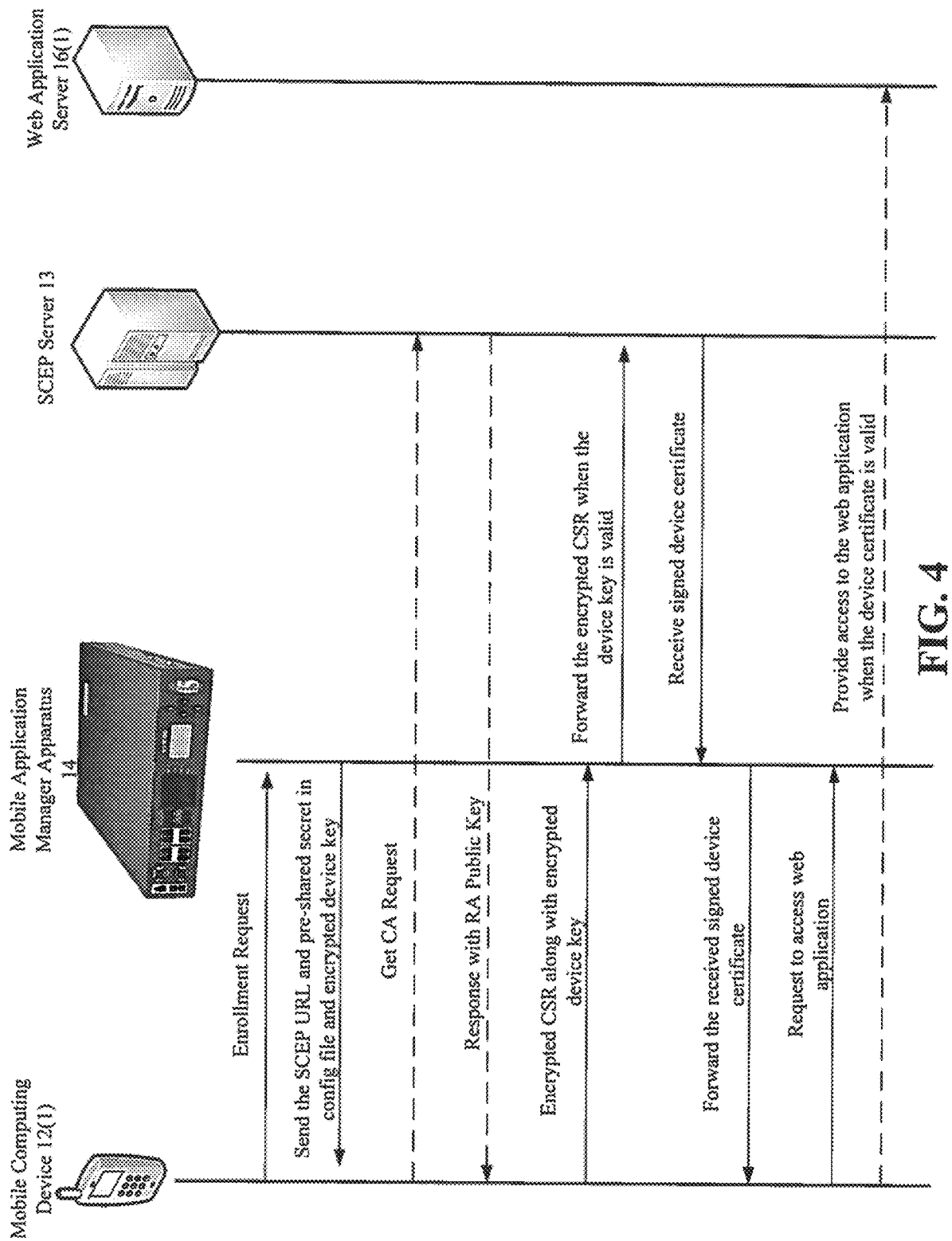
FIG. 4 is an exemplary sequence flow diagram of a method for secured SCEP enrollment for client devices.

Accordingly, the memory 20 of the mobile application manager apparatus 14 can store one or more applications that can include computer executable instructions that, when executed by the mobile application manager apparatus 14, causes the mobile application manager apparatus 14 to perform actions, such as to transmit, receive, or otherwise process messages, for example, and to perform other actions described and illustrated below with reference to FIGS. 3-4.

The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the mobile application manager apparatus 14 itself, may be located in virtual server(s) running in a cloud-based computing environment rather than being tied to one or more specific physical network computing devices. Also, the application(s) may be running in one or more virtual machines (VMs) executing on the mobile application manager apparatus 14. Additionally, in at least one of the various embodiments, virtual machine(s) running on the SCEP server may be managed or supervised by a hypervisor.

The optional configurable hardware logic device 21 in the mobile application manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits ("ASICs") and/or programmable logic units ("PLUs").

The communication system 24 in the mobile application manager apparatus 14 is used to operatively couple and communicate between the mobile application manager apparatus 14, the plurality of mobile computing devices 12(1)-12(n), the SCEP server 13, and the plurality of web application servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of mobile computing devices 12(1)-12(n) of the network traffic management system 10, include a central processing unit (CPU) or processor, a memory, input/display device interface, configurable logic device and an input/output system or I/O system, which are coupled together by a bus or other link. The plurality of mobile computing devices 12(1)-12(n), in this example, may run interface applications, such as Web browsers, that may provide an interface to make requests for and send and/or receive data to and/or from the web application servers 16(1)-16(n) via the mobile application manager apparatus 14. Additionally, the plurality of mobile computing devices 12(1)-12(n) can include any type of computing device that can receive, render, and facilitate user interaction, such as client computers, network computer, mobile computers, virtual machines (including cloud-based computer), or the like. Each of the plurality of mobile computing devices 12(1)-12(n) utilizes the mobile application manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

The SCEP server 13 of the network traffic management system include a central processing unit (CPU) or processor, a memory, and a communication system, which are coupled together by a bus or other link, although other numbers and/or types of network devices could be used. Generally, the SCEP server 13 assists with obtaining device certificates, via the communication network 30 according to the HTTP-based application RFC protocol or the CIFS or NFS protocol in this example, but the principles discussed herein are not limited to this example and can include other application protocols. A series of applications may run on the SCEP server 13 that allows the transmission of data requested by the mobile application manager apparatus 14. It is to be understood that the SCEP server 13 may be hardware or software or may represent a system with multiple external resource servers, which may include internal or external networks. In this example the SCEP server 13 may be any version of Microsoft® IIS servers or Apache® servers, although other types of servers may be used.

Each of the plurality of web application servers 16(1)-16(n) of the network traffic management system include a central processing unit (CPU) or processor, a memory, and a communication system, which are coupled together by a bus or other link, although other numbers and/or types of network devices could be used. Generally, the plurality of web application servers 16(1)-16(n) process requests for providing access to one or more enterprise web applications received from the plurality of mobile computing devices 12(1)-12(n), mobile application manager apparatus 14, via the communication network 30 according to the HTTP-based application RFC protocol or the CIFS or NFS protocol in this example, but the principles discussed herein are not limited to this example and can include other application protocols. A series of applications may run on the plurality web application servers 16(1)-16(n) that allows the transmission of applications requested by the plurality of mobile computing devices 12(1)-12(n), or the mobile application manager apparatus 14. The plurality of web application servers 16(1)-16(n) may provide data or receive data in response to requests directed toward the respective applications on the plurality web application servers 16(1)-16(n) from the plurality of mobile computing devices 12(1)-12(n) or the mobile application manager apparatus 14. It is to be understood that the plurality of web application servers 16(1)-16(n) may be hardware or software or may represent a system with multiple external resource servers, which may include internal or external networks. In this example the plurality of web application servers 16(1)-16(n) may be any version of Microsoft IIS servers or Apache® servers, although other types of servers may be used.

Although the plurality of web application servers 16(1)-16(n) are illustrated as single servers, one or more actions of the SCEP server 13 and each of the plurality of web application servers 16(1)-16(n) may be distributed across one or more distinct network computing devices. Moreover, the plurality of web application servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of web application servers 16(1)-16(n) operate to manage and/or otherwise coordinate operations of the other network computing devices. The plurality of web application servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of web application servers 16(1)-16(n) depicted in FIG. 1 can operate within mobile application manager apparatus 14 rather than as a stand-alone server communicating with mobile application manager apparatus 14 via the communication network(s) 30. In this example the plurality of web application servers 16(1)-16(n) operate within the memory 20 of the mobile application manager apparatus 14.

While the mobile application manager apparatus 14 is illustrated in this example as including a single device, the mobile application manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise mobile application manager apparatus 14 in other examples can be standalone devices or integrated with one or more other devices or applications, such as one of the SCEP server 13, plurality of web application servers 16(1)-16(n) or, the mobile application manager apparatus 14, or applications coupled to the communication network(s), for example. Moreover, one or more of the devices of the mobile application manager apparatus 14 in these examples can be in a same or a different communication network 30 including one or more public, private, or cloud networks, for example.

Although an exemplary network traffic management system 10 with the plurality of mobile computing devices 12(1)-12(n), the SCEP server 13, the mobile application manager apparatus 14, and the plurality of web application servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the mobile application manager apparatus 14, the plurality of mobile computing devices 12(1)-12(n), the SCEP server 13 or the plurality of web application servers 16(1)-16(n), for example, may be configured to operate as virtual instances on the same physical machine. In other words, one or more of mobile application manager apparatus 14, the SCEP server 13, the plurality of mobile computing devices 12(1)-12(n), or the plurality of web application servers 16(1)-16(n) illustrated in FIG. 1 may operate on the same physical device rather than as separate devices communicating through a network as depicted in FIG. 1. There may be more or fewer plurality of mobile computing devices 12(1)-12(n), SCEP server 13, mobile application manager apparatus 14, or the plurality of web application servers 16(1)-16(n) than depicted in FIG. 1. The plurality of mobile computing devices 12(1)-12(n), the SCEP server 13, or the plurality of web application servers 16(1)-16(n) could be implemented as applications on mobile application manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for secured SCEP enrollment for client devices will now be described with reference to FIGS. 1-4. First in step 305, the mobile application manager apparatus 14 receives a request to enroll from one of the plurality of mobile devices 12(1)-12(n), although the mobile application manager apparatus 14 can receive other types and/or numbers of requests from the plurality of mobile computing devices 12(1)-12(n). By way of example only, the mobile application manager apparatus 14 may receive the user credentials of the user of the requesting one of the plurality of mobile computing devices 12(1)-12(n) as the enrollment information, although the mobile application manager apparatus 14 can receive other types and/or amounts of information from the requesting one of the plurality of mobile computing devices 12(1)-12(n). In another example, the mobile application manager apparatus 14 can receive other information, such as geographic location information, role of the user of the requesting one of the plurality of mobile computing devices, IP address, type of the requesting device, current operating system on the mobile computing device, and/or installed mobile applications and security policies from the requesting one of the plurality of mobile computing devices 12(1)-12(n).

Next in step 310, the mobile application manager apparatus 14 performs an authentication check based on the received data to determine whether to enroll the requesting one of the plurality of mobile computing devices 12(1)-12(n), although the mobile application manager apparatus 14 can perform the authentication check in other manners and/or using other types and/or amounts of information. In this example, the mobile application manager apparatus 14 compares the received information associated with the requesting one of the plurality of mobile computing devices 12(1)-12(n) against the existing access control checks to determine when to enroll the requesting one of the plurality of mobile computing devices 12(1)-12(n), although the mobile application manager apparatus 14 can perform the authentication checks using other techniques. Accordingly, when the mobile application manager apparatus 14 determines that the requesting one of the plurality of mobile devices 12(1)-12(n) should not be enrolled, then the No branch is taken to next step 315.

In step 315, the mobile application manager apparatus 14 rejects the received request for enrollment and the exemplary method ends at step 375.

However if back in step 310, when the mobile application manager apparatus 14 determines that the requesting one of the plurality of mobile devices 12(1)-12(n) should be enrolled, then the Yes branch is taken to next step 320. In step 320, the mobile application manager apparatus 14 stores the received enrollment information within the memory 20, although the mobile application manager apparatus 14 can store the registration information at other memory locations. Further, the mobile application manager apparatus 14 may store the information associated with the requesting one of the plurality of mobile computing devices 12(1)-12(n), such as the one or more installed mobile applications and security policies by way of example, in a state table that includes a list of all enrolled devices, although the mobile application manager apparatus 14 can store the information at other memory locations.

Next in step 325, the mobile application manager apparatus 14 completes the enrollment of the requesting one of the plurality of mobile devices 12(1)-12(n) by sending the requesting one of the plurality of mobile devices 12(1)-12(n) a configuration file with a pre-shared secret and a SCEP uniform resource locator (URL) that includes a unique encrypted device key, although the mobile application manager apparatus 14 can include other types or amounts of information back to the requesting one of the plurality of mobile devices 12(1)-12(n) after successful enrollment. In this example, the mobile application manager apparatus 14 also stores the encrypted device key and the data associated with the requesting one of the plurality of mobile devices 12(1)-12(n) in order to use the enrollment information, and the encrypted device key to authenticate the requesting one of the plurality of mobile devices 12(1)-12(n) during subsequent requests. By way of example, the mobile application manager apparatus 14 can encrypt the unique device key that is obtained from the requesting one of the plurality of mobile devices 12(1)-12(n) during the enrollment step using a private key, although the mobile application manager apparatus 14 can encrypt the unique device key using other techniques.

Additionally in this example, the requesting one of the plurality of mobile devices 12(1)-12(n) sends a get certificate authority (CA) request to SCEP server 13 and receives a response with a public key back from the SCEP server 13, although the requesting one of the plurality of mobile devices 12(1)-12(n) can use other techniques to obtain the public key from the SCEP server 13. Further in this example, the requesting one of the plurality of mobile devices 12(1)-12(n) uses the public key received from the SCEP server 13 to encrypt a certificate signing request (CSR). As it would be appreciated by a person having ordinary skill in the art, the certificate signing request relates to a request to sign a device certificate and this request is required to be encrypted as the CSR includes confidential information associated with the enrolled one of the plurality of mobile devices. Additionally, the enrolled one of the plurality of mobile devices 12(1)-12(n) also generates a public-private key pair using the received public key from the SCEP server 13.

In the next step 330, the mobile application manager apparatus 14 receives an encrypted certificate signing request from the enrolled one of the plurality of mobile devices 12(1)-12(n) using the SCEP URL. In this example, the encrypted certificate signing request includes the actual request to sign the certificate, the pre-shared secret that was shared in step 325, and the public key that was generated by the enrolled one of the plurality of mobile devices 12(1)-12(n), although the encrypted CSR can include other types or amounts of information. Additionally as illustrated above, SCEP URL also includes the encrypted device key that is sent along with the encrypted certificate signing request.

Next in step 335, the mobile application manager apparatus 14 decrypts the encrypted device key that was received in the SCEP URL along with the encrypted certificate signing request using a private key, although the mobile application manager apparatus 14 can decrypt the encrypted device key using other techniques.

In step 340, the mobile application manager apparatus 14 determines when the decrypted device key is valid by comparing the decrypted device key against the data associated with the enrolled one of the plurality of mobile devices 12(1)-12(n) in a table stored in the memory 20, although the mobile application manager apparatus 14 can use other techniques to determine whether the decrypted device key is valid. Accordingly, when the decrypted device key exactly matches with the data stored in the table associated with the enrolled one of the plurality of mobile devices 12(1)-12(n), then it is determined that the decrypted device key is valid and also the enrolled one of the plurality of mobile devices 12(1)-12(n) being an authenticated device. By using this technique, the technology disclosed is able to prevent malicious devices from using the encrypted device key to obtain a device certificate from the SCEP server.

When the mobile application manager apparatus 14 determines in step 340 that the device key is not valid, then the No branch is taken to step 315 where the received request is rejected and the exemplary method ends at step 375. Additionally, the mobile application manager apparatus 14 can send a notification to a network administrator indicating that the device key is invalid so that unauthorized device certificate need not be issued to the enrolled one of the plurality of mobile devices 12(1)-12(n). Alternatively, the mobile application manager apparatus 14 can determine that the device key is valid when the encrypted device key is being used for the first time from the enrolled one of the plurality of mobile devices 12(1)-12(n). If the mobile application manager apparatus 14 had received the same encrypted device key for the second time, then it would determine that the encrypted device key is being compromised and so the encrypted device key would be determined as invalid.

However if back in step 340, when the mobile application manager apparatus 14 determines that the decrypted device key is valid, then the Yes branch is taken to step 345. In step 345, the mobile application manager apparatus 14 forwards the received encrypted certificate signing request to the SCEP server 13. In this example, the mobile application manager apparatus 14 updates the table indicating a request for a certificate was received with the encrypted certificate signing request along with the encrypted device key for the requesting one of the plurality of mobile devices 12(1)-12(n).

In step 350, the mobile application manager apparatus 14 receives the signed device certificate back from the SCEP server 13. In this example, the SCEP server 13 first decrypts the encrypted certificate signing request with the private key corresponding to the public key that was initially shared with the enrolled one of the plurality of mobile devices 12(1)-12(n), and then checks if the pre-shared secret that is present in the decrypted certificate signing request exactly matches with the pre-shared secret that is stored in the SCEP server 13, although the SCEP server can perform other types or amounts of functions prior to signing and sending the device certificate back to the mobile application manager apparatus 14.

In step 355, the mobile application manager apparatus 14 forwards the received signed device certificate back to the enrolled one of the plurality of mobile devices 12(1)-12(n). Additionally in this step, the mobile application manager apparatus 14 stores the information associated with the signed device certificate along with the information corresponding to the enrolled one of the plurality of mobile devices 12(1)-12(n) in the table, although the mobile application manager apparatus 14 can store the data at other memory locations. Using this stored information, the mobile application manager apparatus 14 can determine and prevent a malicious device from using signed device certificate that was originally created and sent to the enrolled one of the plurality of mobile devices 12(1)-12(n).

Next in step 360, the mobile application manager apparatus 14 receives a request to access the web application on the plurality of web application servers 16(1)-16(n) along with the signed device certificate from the enrolled one of the plurality of mobile devices 12(1)-12(n), although the enrolled one of the plurality of mobile devices 12(1)-12(n) can use the signed device certificate to authenticate itself with the mobile application manager apparatus 14. Additionally, the mobile application manager apparatus 14 obtains the device key along with the device certificate from the enrolled one of the plurality of mobile devices 12(1)-12(n).

In step 365, the mobile application manager apparatus 14 determines when the received device certificate is valid by comparing the details of the received device certificate against the data that is stored in the table include the list of authorized device keys, although the mobile application manager apparatus 14 can use other techniques to determine the validity of the device certificate. Accordingly, when the mobile application manager apparatus 14 determines that the device certificate is invalid, then the No branch is taken to step 315 where the received request is rejected indicating that it is from a malicious device and the exemplary method ends in step 375.

However if back in step 365, when the mobile application manager apparatus 14 determines that the device certificate is valid, then the Yes branch is taken to step 370. In step 370, the mobile application manager apparatus 14 successfully authenticates the requesting one of the plurality of mobile devices 12(1)-12(n) or provides the access to the requested web application executing on one of the plurality of web application servers 16(1)-16(n) and the exemplary method ends at step 375.

As illustrated and described by way of the examples here, the claimed technology effectively assist with providing secure SCEP enrollment of client devices. Additionally, the claimed technology provides secure SCEP enrollment by:

first, ensuring that only the enrolled devices can retrieve the certificates by including an obfuscated/encrypted device key as part of the SCEP uniform resource indicator (URI) sent to the client device; second, ensuring that device key is used only once by maintaining a list of keys used to authorize SCEP requests; and lastly, preventing an unauthorized user from retrieving the SCEP certificate for the device by determining whether the device key in the device certificate received from the requesting device is identical to the device key in the list of authorized device keys.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for secured SCEP enrollment for client devices implemented by a network traffic management system comprising one or more network traffic apparatuses, client devices, or server devices, the method comprising:
   receiving an encrypted certificate signing request and an encrypted device key from an enrolled mobile device, the encrypted certificate signing request and the encrypted device key being encrypted separately with different cryptographic keys;
   decrypting the received encrypted device key to generate a decrypted device key without decrypting the encrypted certificate signing request;
   forwarding the received encrypted certificate signing request to a simple certificate enrollment protocol server upon determining the decrypted device key is present in stored data and is being used only once;
   receiving a signed device certificate from the simple certificate enrollment protocol server as a response to the forwarded encrypted certificate signing request; and
   completing a secured simple certificate enrollment protocol enrollment by forwarding the signed device certificate to the enrolled mobile device.

2. The method as set forth in claim 1, further comprising sending a simple certificate enrollment protocol uniform resource locator including the encrypted device key to the enrolled mobile device in response to a request for enrollment.

3. The method as set forth in claim 1, further comprising:
   receiving a request to access a web application or authenticate the enrolled mobile device with the forwarded signed device certificate from the enrolled mobile device;
   determining the received signed device certificate to be valid when the device key in the received signed device certificate is present in a list comprising authorized device keys; and
   providing access to the requested web application or authenticate the enrolled mobile device when the received signed device certificate is determined to be valid.

4. The method as set forth in claim 1, further comprising:
   rejecting a subsequent secured simple certificate enrollment protocol enrollment in response to determining encrypted device key is used for a second time.

5. The method as set forth in claim 1, further comprising:
   updating the stored data to indicate the encrypted device key has been used in response to forwarding the received encrypted certificate signing request.

6. The method as set forth in claim 1, wherein the encrypted certificate signing request and the encrypted device key are sent from the enrolled mobile device using a single request.

7. The method as set forth in claim 6, wherein the encrypted certificate signing request and the encrypted device key are incorporated in a uniform resource locator of the single request.

8. A non-transitory computer readable medium having stored thereon instructions for secured SCEP enrollment for client devices comprising executable code which when executed by one or more processors, causes the processors to:
   receive an encrypted certificate signing request and an encrypted device key from an enrolled mobile device, the encrypted certificate signing request and the encrypted device key being encrypted separately with different cryptographic keys;
   decrypt the received encrypted device key to generate a decrypted device key without decrypting the encrypted certificate signing request;
   forward the received encrypted certificate signing request to a simple certificate enrollment protocol server upon determining the decrypted device key is present in stored data and is being used only once;
   receive a signed device certificate from the simple certificate enrollment protocol server as a response to the forwarded encrypted certificate signing request; and
   complete a secured simple certificate enrollment protocol enrollment by forwarding the signed device certificate to the enrolled mobile device.

9. The computer readable medium as set forth in claim 8 further comprising send a simple certificate enrollment protocol uniform resource locator including the encrypted device key to the enrolled mobile device in response to a request for enrollment.

10. The computer readable medium as set forth in claim 8, further comprises:
    receive a request to access a web application or authenticate the enrolled mobile device with the forwarded signed device certificate from the enrolled mobile device;
    determine the received signed device certificate to be valid when the device key in the received signed device certificate is present in a list comprising authorized device keys; and
    provide access to the requested web application or authenticate the enrolled mobile device when the received signed device certificate is determined to be valid.

11. The computer readable medium as set forth in claim 8, further comprising:
    reject a subsequent secured simple certificate enrollment protocol enrollment in response to determining the encrypted device key is used for a second time.

12. The computer readable medium as set forth in claim 8, wherein the instructions further comprise executable code which when executed by one or more processors, causes the processors to:

update the stored data to indicate the encrypted device key has been used in response to forwarding the received encrypted certificate signing request.

13. A mobile application manager apparatus, comprising memory comprising programmed instructions stored in the memory and one or more processors configured to be capable of executing the programmed instructions stored in the memory to:

receive an encrypted certificate signing request and an encrypted device key from an enrolled mobile device, the encrypted certificate signing request and the encrypted device key being encrypted separately with different cryptographic keys;

decrypt the received encrypted device key to generate a decrypted device key without decrypting the encrypted certificate signing request;

forward the received encrypted certificate signing request to a simple certificate enrollment protocol server upon determining the decrypted device key is present in stored data and is being used only once;

receive a signed device certificate from the simple certificate enrollment protocol server as a response to the forwarded encrypted certificate signing request; and complete a secured simple certificate enrollment protocol enrollment by forwarding the signed device certificate to the enrolled mobile device.

14. The apparatus as set forth in claim 13, wherein the one or more processors are further configured to be capable of executing the programmed instructions stored in the memory to send a simple certificate enrollment protocol uniform resource locator including the encrypted device key to the enrolled mobile device in response to a request for enrollment.

15. The apparatus as set forth in claim 13, wherein the one or more processors are further configured to be capable of executing the programmed instructions stored in the memory to:

receive a request to access a web application or authenticate the enrolled mobile device with the forwarded signed device certificate from the enrolled mobile device;

determine the received signed device certificate to be valid when the device key in the received signed device certificate is present in a list comprising authorized device keys; and provide access to the requested web application or authenticate the enrolled mobile device when the received signed device certificate is determined to be valid.

16. The apparatus as set forth in claim 13, wherein the one or more processors are further configured to be capable of executing the programmed instructions stored in the memory to:

reject a subsequent secured simple certificate enrollment protocol enrollment in response to determining the encrypted device key is used for a second time.

17. The apparatus as set forth in claim 13, wherein the one or more processors are further configured to be capable of executing the programmed instructions stored in the memory to:

update the stored data to indicate the encrypted device key has been used in response to forwarding the received encrypted certificate signing request.

18. A network traffic management system, comprising one or more traffic management apparatuses, client devices, or server devices, the network traffic management system comprising memory comprising programmed instructions stored thereon and one or more processors configured to be capable of executing the stored programmed instructions to:

receive an encrypted certificate signing request and an encrypted device key from an enrolled mobile device, the encrypted certificate signing request and the encrypted device key being encrypted separately with different cryptographic keys;

decrypt the received encrypted device key to generate a decrypted device key without decrypting the encrypted certificate signing request;

forward the received encrypted certificate signing request to a simple certificate enrollment protocol server upon determining the decrypted device key is present in stored data and is being used only once;

receive a signed device certificate from the simple certificate enrollment protocol server as a response to the forwarded encrypted certificate signing request; and complete a secured simple certificate enrollment protocol enrollment by forwarding the signed device certificate to the enrolled mobile device.

19. The network traffic management system of claim 18, wherein the one or more processors are further configured to be capable of executing the programmed instructions stored in the memory to send a simple certificate enrollment protocol uniform resource locator including the encrypted device key to the enrolled mobile device in response to a request for enrollment.

20. The network traffic management system of claim 18, wherein the one or more processors are further configured to be capable of executing the programmed instructions stored in the memory to:

receive a request to access a web application or authenticate the enrolled mobile device with the forwarded signed device certificate from the enrolled mobile device;

determine the received signed device certificate to be valid when the device key in the received signed device certificate is present in a list comprising authorized device keys; and provide access to the requested web application or authenticate the enrolled mobile device when the received signed device certificate is determined to be valid.

21. The network traffic management system of claim 18, wherein the one or more processors are further configured to be capable of executing the programmed instructions stored in the memory to:

reject a subsequent secured simple certificate enrollment protocol enrollment in response to determining the encrypted device key is used for a second time.

22. The network traffic management system of claim 18, wherein the one or more processors are further configured to be capable of executing the programmed instructions stored in the memory to:

update the stored data to indicate the encrypted device key has been used in response to forwarding the received encrypted certificate signing request.

* * * * *